United States Patent
Zink et al.

(10) Patent No.: US 10,133,944 B2
(45) Date of Patent: *Nov. 20, 2018

(54) DIGITAL NEUROMORPHIC (NM) SENSOR ARRAY, DETECTOR, ENGINE AND METHODOLOGIES

(71) Applicants: VOLKSWAGEN AG, Wolfsburg (DE); AUDI AG, Ingolstadt (DE); PORSCHE AG, Stuttgart (DE)

(72) Inventors: Edmund Dawes Zink, McKinney, TX (US); Douglas Allen Hauger, San Francisco, CA (US); Lutz Junge, San Mateo, CA (US); Luis Marcial Hernandez Gonzalez, Sunnyvale, CA (US); Jerramy L. Gipson, Willits, CA (US); Anh Vu, Moreno Valley, CA (US); Martin Hempel, Menlo Park, CA (US); Nikhil J. George, Palo Alto, CA (US)

(73) Assignees: Volkswagen AG (DE); Audi AG (DE); Porsche AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/386,220

(22) Filed: Dec. 21, 2016

(65) Prior Publication Data

US 2018/0173983 A1 Jun. 21, 2018

(51) Int. Cl.
*G06K 9/00* (2006.01)
*G06T 7/246* (2017.01)
(Continued)

(52) U.S. Cl.
CPC ..... *G06K 9/00986* (2013.01); *G06K 9/00765* (2013.01); *G06K 9/4638* (2013.01); *G06K 9/4661* (2013.01); *G06K 9/481* (2013.01); *G06K 9/605* (2013.01); *G06T 7/215* (2017.01); *G06T 7/248* (2017.01); *G06K 2009/00738* (2013.01)

(58) Field of Classification Search
CPC .......... G06K 9/00093; G06K 9/00067; G06K 9/00073; G06K 9/00013; G06K 9/66; G06K 9/4671; G06K 9/00986; G06K 9/00765; G06K 9/4638; G06K 9/4661; G06K 9/481; G06K 9/605; G06K 2009/00738; G06F 17/30247; G06F 17/30259; G06F 17/3028; G06F 21/32; H04L 9/3231; G06N 3/02; B25J 9/161; G05D 1/0246; G06T 7/215; G06T 7/248
See application file for complete search history.

(56) References Cited

U.S. PATENT DOCUMENTS 6,020,953 A 2/2000 Barrows
6,023,521 A 2/2000 Sarpeshkar et al.
(Continued)

OTHER PUBLICATIONS

Floreano et al., "Miniature curved artificial compound eyes", Published on Jun. 4, 2013 (pp. 9267-9272).*
(Continued)

*Primary Examiner* — Manav Seth
(74) *Attorney, Agent, or Firm* — Barnes & Thornburg LLP

(57) ABSTRACT

A system and methodologies for neuromorphic vision simulate conventional analog NM system functionality and generate digital NM image data that facilitate improved object detection, classification, and tracking.

32 Claims, 19 Drawing Sheets

(51) Int. Cl.
*G06T 7/215* (2017.01)
*G06K 9/46* (2006.01)
*G06K 9/48* (2006.01)
*G06K 9/60* (2006.01)

(56) References Cited

U.S. PATENT DOCUMENTS

| | | | | |
|---|---|---|---|---|
| 6,212,289 | B1* | 4/2001 | Sarpeshkar | G06T 7/20 |
| | | | | 382/107 |
| 6,384,905 | B1* | 5/2002 | Barrows | G06T 7/269 |
| | | | | 356/28 |
| 7,659,967 | B2* | 2/2010 | Barrows | G01P 3/36 |
| | | | | 356/28 |
| 7,925,051 | B2 | 4/2011 | Gensolen et al. | |
| 8,401,297 | B1 | 3/2013 | Apostolos et al. | |
| 8,694,449 | B2* | 4/2014 | Weng | G06N 3/08 |
| | | | | 706/15 |
| 8,780,240 | B2* | 7/2014 | Posch | H04N 5/335 |
| | | | | 348/294 |
| 8,930,291 | B1* | 1/2015 | Srinivasa | G06N 3/063 |
| | | | | 706/12 |
| 8,959,040 | B1* | 2/2015 | Cruz-Albrecht | G06N 3/049 |
| | | | | 706/39 |
| 9,014,416 | B1* | 4/2015 | Fisher | H01L 27/14609 |
| | | | | 382/100 |
| 9,047,568 | B1* | 6/2015 | Fisher | G06N 3/0472 |
| 9,070,039 | B2* | 6/2015 | Richert | G06K 9/36 |
| 9,098,811 | B2* | 8/2015 | Petre | G06N 3/049 |
| 9,111,215 | B2* | 8/2015 | Piekniewski | G06N 3/049 |
| 9,111,226 | B2* | 8/2015 | Richert | G06N 3/049 |
| 9,123,127 | B2* | 9/2015 | Richert | G06T 1/20 |
| 9,129,221 | B2* | 9/2015 | Piekniewski | G06N 3/049 |
| 9,152,915 | B1* | 10/2015 | Gabardos | G06N 3/02 |
| 9,183,493 | B2* | 11/2015 | Richert | G06N 3/049 |
| 9,186,793 | B1* | 11/2015 | Meier | B25J 9/1694 |
| 9,195,903 | B2* | 11/2015 | Andreopoulos | G06K 9/4676 |
| 9,195,934 | B1 | 11/2015 | Hunt et al. | |
| 2014/0064609 | A1 | 3/2014 | Petre et al. | |
| 2014/0229411 | A1 | 8/2014 | Richert et al. | |
| 2014/0258195 | A1 | 9/2014 | Weng et al. | |
| 2015/0161505 | A1 | 6/2015 | Sugioka | |

OTHER PUBLICATIONS

Tsang et al., "Neuromorphic Implementation of Active Gaze and Vergence Control", Published in 2008 (pp. 1076-1079).*
Brändli; Event-Based Machine Vision; Doctoral Thesis; 2015.
Garcia et al.; pyDVS: An Extensible, Real-time Dynamic Vision Sensor Emulator using Off-the-Shelf Hardware; 2016 IEEE Symposium Series on Computational Intelligence (SSCI); Dec. 6, 2016; pp. 1-7.
Kuhn; Fast MPEG-4 Motion Estimation: Processor Based and Flexible VLSI Implementations; Journal of VLSI Signal Processing Systems for Signal, Image, and Video Technology; Oct. 1, 1999; vol. 23, No. 1; pp. 67-92.
Mueggler et al.; Lifetime Estimation of Events from Dynamic Vision Sensors; 2015 IEEE International Conference on Robotics and Automation (ICRA); IEEE; May 26, 2015; pp. 4874-4881.
Rueckauer et al.; Evaluation of Event-Based Algorithms for Optical Flow with Ground-Truth from Inertial Measurement Sensor; Frontiers in Neuroscience; Apr. 25, 2016; vol. 10, Article 176.
Tschechne et al.; Bio-Inspired Optic Flow from Event-Based Neuromorphic Sensor Input; ECCV 2016 Conference; Oct. 5, 2014; pp. 171-182.
Search Report and Written Opinion for International Patent Application No. PCT/EP2017/083411; dated Mar. 21, 2018.

* cited by examiner

DIGITAL NEUROMORPHIC (NM) SENSOR ARRAY, DETECTOR, ENGINE AND METHODOLOGIES

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

The present disclosure relates to systems, components, and methodologies for image processing. In particular, the present disclosure relates to systems, components, and methodologies that perform image processing for using digital NeuroMorphic (NM) vision techniques.

SUMMARY

According to the present disclosure, systems, components, and methodologies are provided for NM-based image data generation, image data processing and subsequent use to detect and/or identify objects and object movement in such image data for assistance, automation, control and/or documentation.

In accordance with disclosed embodiments, structure and software are provided for simulation of conventional analog NM system functionality using a digital NM vision system that incorporates at least one detector that includes one or more NM sensors, a digital retina implemented using, for example, CMOS technology that enables generation of digital NM data for image data processing by a digital NM engine that facilitates improved object detection, classification, and tracking. As such, exemplary embodiments are directed to structure and software that may simulate analog NM system functionality.

In accordance with at least one embodiment, the digital NM engine may include a combination of one or more detectors and one or more processors running software on back-end to generate digital NM output.

In accordance with at least one embodiment, the digital NM vision system, its components and utilized methodologies may be used to compress high framerate video data by performing feature extraction close to an imaging sensor to generate an encoded version of image data that includes differences and surrounding spatio-temporal regions for subsequent image processing. Thus, in accordance with at least one embodiment, the hardware and methodologies may be utilized as an effective method for compressing high framerate video, e.g., by analyzing image data to compress the data by capturing differences between a current frame and a one or more previous frames and applying a transformation.

In accordance with at least one embodiment, the digital NM vision system and/or at least a subset of its components may be incorporated in a stereo neuromorphic pair. In accordance with at least one implementation, components of the digital NM vision system may be incorporated in a compound camera. In such an implementation, the computational element of each imaging sensor may be coupled to other computational elements of other imaging sensors, e.g., adjacent sensors or other types of sensors, to collaborate with other computational elements to provide functionality.

For example, in accordance with at least one implementation, the digital NM vision system components may be incorporated in an event-based camera.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

Figure 1:
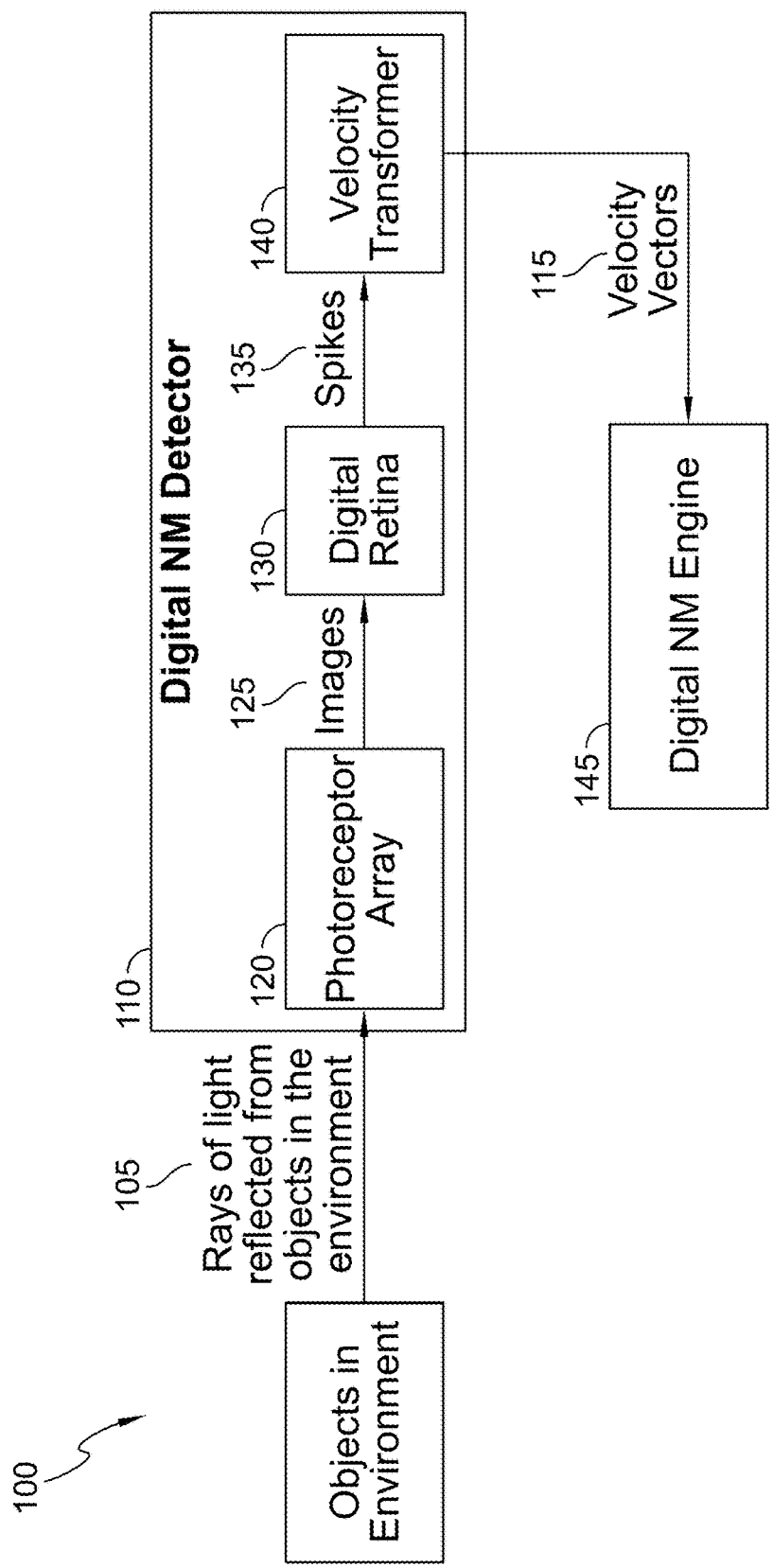
FIG. 1 is an illustrative diagram of hardware structure and software utilized by disclosed embodiments to provide simulation of conventional, human eye, analog NM system functionality.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are directed to structure and software for simulation of conventional NM system vision functionality, e.g., that provided by the human eye.

Commercially available image detection and processing equipment routinely use solid-state detectors to capture large numbers of frames each second. By displaying those images at high speed, the viewer has the illusion of motion. This is the basis of recorded video images.

However, when such video data is analyzed by computers running image processing and analysis software, the large number of frames used to give the impression of motion can overwhelm the computational capability of the computers. This is because a high frame rate video may provide so much data that the computer is incapable of analyzing the data because the data is changing too quickly. Conventionally, efforts have been made to increase the ability for image processing by increasing the processing speed of processors analyzing the image data.

Additionally, analog-based Neuromorphic (NM) processing techniques have been developed that mimic or simulate the human eye. NM processing relies on the idea that it is not necessary to analyze all of the data included in a video image; rather NM prioritizes analysis on determining the changes that occur in the image data while de-prioritizing the image data that remains the same from frame to frame because the non-changing data is redundant.

More specifically, by mimicking operation of the human eye and brain, processors and software can capture and identify image data of interest, spatial and temporal changes, and output that data for labor intensive image processing that enables all aspects of image processing, automation and assistive control, analysis and diagnostic systems utilizing image processing.

This requires the ability to continuously track and record pixel amplitudes for only those pixels amplitudes changes above a prescribed threshold. Conventionally, this approach has been implemented using analog NM cameras; however, application of such technology provides high effective frame rates but with spatial image sizes and spatial resolutions due to the extra cost of analog processing embedded into each pixel of the imager. Thus, there is no conventional mechanism to effectively use NM image processing for real-time acquired image data has yet to be successfully implemented.

To the contrary, the presently disclosed, digital NM vision system, its components and utilized methodologies have been developed to performing feature extraction from frame data in a way that enables an imaging sensor(s) to generate an encoded version of image data that includes only data indicating differences indicative of movement and surrounding spatio-temporal regions for subsequent image processing. In turn, this further improves the accuracy and throughput of the system.

In illustrative embodiments, an example of which being illustrated in FIG. 1, structure and software are provided for simulation of conventional analog NM system functionality using a digital NM detector 110 that incorporates a digital retina implemented, for example, using CMOS technology. Thus, as shown in FIG. 1, a digital NM vision system 100 may include a digital NM detector 110 that receives rays of light 105 reflected from objects in an environment. Those rays of light may be detected by a sensor, e.g., photoreceptor or array thereof, 120 that may be configured to convert those rays of light in image data 125, including images of the objects in the environment. For example, each photoreceptor may convert the light energy into, e.g., proportional analog intensity values.

As explained in more detail herein, that image data may be output from the sensor array 120 into a digital retina 130 that converts that image data into "spikes" using various image processing and data processing techniques. However, the digital retina 130 includes digital circuitry that generates spike data indicative of a spike in association with a particular photoreceptor within the sensor array 120 whenever the intensity value measured by that photo receptor exceeds a threshold. The digital retina 130 may be implemented using various solid-state technology including, for example, Complementary Metal-Oxide-Semiconductor (CMOS) implemented technology, e.g., one or more Field Programmable, Gate Arrays (FPGAs), (GPUs) or functionally or structurally similar devices integrated circuits and associated software and/or firmware provided in, for example, Application Specific Integrated Circuits (ASICs).

Spike data is generated not only based on the data generated by that particular photoreceptor but also can take into account data generated by neighboring, nearby or near photo receptors, e.g., one photoreceptor away so as to simulate operation of specific parts of the human eye that utilize communication between photoreceptors when formulating spike data. Spike data 135 generated by the digital retina 130 is input into one or more velocity transformation modules 140 that generate velocity vectors 115 for subsequent analysis by the digital NM engine 145.

Additionally, the digital retina 130 generates, outputs and exchanges various data that enables digital NM vision including spike (sparse) data, 5D (x, y, t, Vx, Vy) velocity data and other digital data that is generated by or analyzed by the digital NM engine 145. Each spike specifies its spatial location within the input image (x, y), its temporal coordinate or timestamp (t), and its optical velocity (Vx, Vy).

In this way, disclosed embodiments provide a digital NM vision system including a digital NM detector that includes a sensor array (including individual sensors), digital retina and velocity transformation modules 140. The digital NM vision system also can include a digital NM engine 145 that perform image and data processing operations on the velocity vector data generated by the digital NM detector that enables image data processing for improved object detection, classification, and tracking, including machine and deep learning. As such, in accordance with at least one embodiment, the digital NM engine 145 may include one or more processors running software to generate digital NM output data for analysis and subsequent control of components with the environment imaged by the detector 110. Operation of the digital NM engine 145 is further discussed herein with connection to FIGS. 17-20.

Appendix A includes an example of one implementation of software code utilized for generation of spike data and associated to velocity vector data.

As used herein, the term "velocity vector" refers to a mathematical representation of optical flow of pixels (or photoreceptors) in image data. Velocity vector data may be used to characterize or represent a velocity space, which may be thought of as the spatial and temporal representation of video data including a plurality of frames depicting movement of an object in an environment.

In velocity space, pixels having the same velocity vector may be aggregated and associated with one another to perform velocity segmentation. As explained herein, velocity segmentation enables the ability to identify and differentiate objects within the image data based on their relative motion over frames of image data.

In accordance with at least one additional embodiment, digital NM detector output may include velocity vector data that indicates or identifies basic features (e.g., edges) of objects included in the image data.

Unlike conventional imaging processing technology, this identification of basic features may be performed at the fovea stage. A fovea (or more specifically, the foveal centralis) in anatomical terms, is the small depression in the retina of the eye where visual acuity is highest. The center of the field of vision is focused in this region, where retinal cones are particularly concentrated. As a result, the fovea provides acute central vision that enable humans to perform activities that require significant visual acuity. Within the human eye, the fovea is surrounded by decreasingly dense layers of sensory cells so as to provide ever decreasing resolution data on the periphery of the human field of vision.

Accordingly, in machine implemented image processing, the term "fovea" has been used to refer to a shape that corresponds to detection of a shape of an object of interest that enables tracking of the eye's foveal centralis on that object. By generating foveas for objects, the digital NM visions system is performing operations akin to "smooth pursuit" eye movement in the human eye. Smooth pursuit eye movements allow the eyes to closely follow a moving object. It is one of two ways that visual animals can voluntarily shift gaze, the other being saccadic eye movements. As a result, the term "fovea" is used to refer to the edge data generated by the digital NM vision system because that data is used by the human eye to center the human eye's fovial centralis on an object for object tracking. It is well understood that the human eye can only perform smooth pursuit eye movement with regard to one object. To the contrary, in accordance with the presently disclosed embodiments, smooth pursuit sensor movement may be used to track a plurality of objects simultaneously.

With this understanding of fovea data generated by the digital NM vision system in mind, it should be appreciated that further data details may be necessary to document what an object looks like. Those further details may require recording and analyzing pixel data surrounding each spike within the fovea. This may enable the ability to identify color, texture, etc. This neighborhood of pixel data surrounding each spike may be conceptually thought of as a "micro-fovea" because generation of an object's fovea may be performed by aggregating the micro-fovea data. In this way, foveas are created by temporal and spatial aggregation of micro-foveas along a velocity profile.

As a result, micro-fovea can be linked together to define one or more boundaries between foreground objects and background, thus creating velocity silhouettes. Each velocity silhouette defines an edge at the boundary between a foreground object and a background object. In this way, intra-object fovea trajectories (i.e., for more than one object) indicate shape change for non-rigid objects.

Thus, micro-foveas include the spike data generated by an object's motion and pixel data surrounding each of the spikes within that data. Thus, each object within an image sequence might have a fovea generated for it which indicates the motion of each object during that image sequence, as indicated by a plurality of microfovea.

Depending on what the object is, image processing may be altered depending on the type of object being tracked, e.g., the difference between tracking of a stop sign and tracking of a pedestrian. The further details provided by the micro-fovea may be analyzed to enable the ability to identify color, texture, etc.

Further, in accordance with at least one embodiment of the digital NM vision system 100, once edges of an object are detected using spike data, additional analysis may be performed on the image data at the pixel level to improve the quality of the image. In other words, the motion present in an image or sequence of images (as identified by spikes) is used to identify objects of interest that may be subsequently analyzed at the pixel level to provide additional information.

Thus, although FIG. 1 illustrates the digital NM engine 145 as receiving output from the digital NM detector 110, it should be appreciated that, in accordance with at least one embodiment, the digital NM engine 145 may provide data to the digital NM detector 110 as well as receive input from the detector 110. Such connections and communication may be utilized to perform machine learning for the digital NM detector 110 to facilitate further functionality and/or interoperability and/or improve upon functionality, analysis and operation of digital NM detector 110.

As explained above, the motion present for an object during an image sequence may be represented using spike data, which may be analyzed to determine velocity vector data. That velocity vector data may then be analyzed by the digital NM engine 145 to identify edges of the object. Velocity segmentation of the image data using the vector velocities generated from the spike data may be used to generate edge data. By aggregating the edge data of the object, a representation of the object, i.e., a fovea, may be produced. Conceptually, the fovea is made up of the trajectory of velocity segmentations for the object over time.

Figure 2:
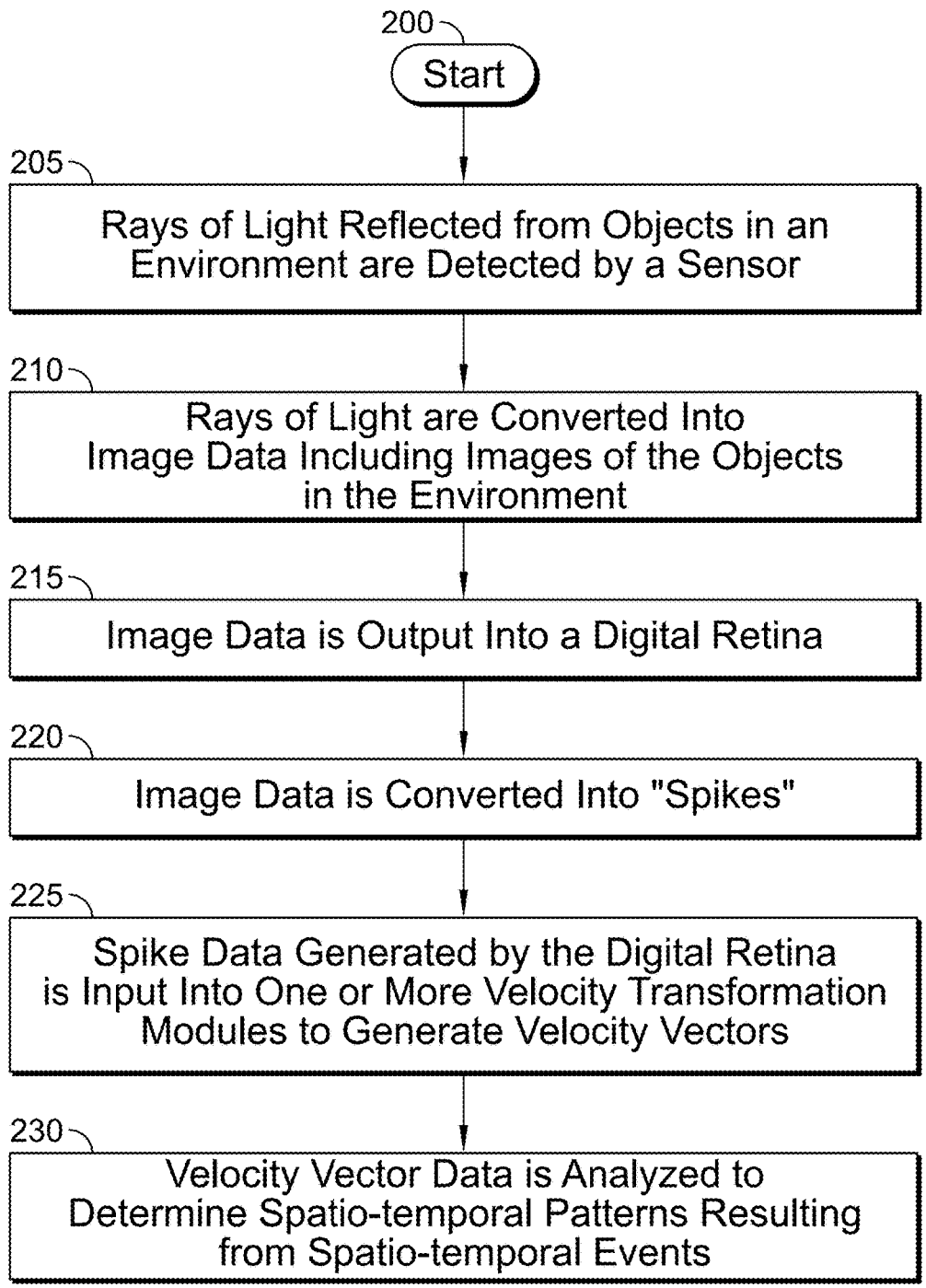
FIG. 2 illustrates an example of a methodology provided in accordance with at least one embodiment that performs simulation of conventional, human eye, analog NM system functionality.

FIG. 2 illustrates an example of a methodology provided in accordance with at least one embodiment that performs simulation of conventional, human eye, analog NM system functionality. As shown in FIG. 2, the methodology begins at 200 and control proceeds to 205 at which rays of light reflected from objects in an environment are detected by a sensor. Control then proceeds to 210 at which those rays of light are converted into image data including images of the objects in the environment, e.g., represented by proportional analog intensity values.

Control 215, at which that image data is output into a digital retina. Subsequently, at 220, the image data is converted into "spikes" based on the data generated by a particular photoreceptor but also taking into account data generated by neighboring, nearby or near photoreceptors, e.g., one photoreceptor away so as to simulate operation of specific parts of the human eye that utilize communication between photo receptors when formulating spike data. Control then proceeds to 225, at which spike data generated by the digital retina is input into one or more velocity transformation modules to generate velocity vectors. Control then proceeds to 230, at which the velocity vector data is analyzed to determine spatio-temporal patterns resulting from spatio-temporal events to perform object detection, classification, and tracking, including machine and deep learning, e.g., including identifying edges of objects by velocity sementation of the image data using the vector velocities generated from the spike data. By aggregating the edge data of the object, a representation of the object, i.e., a fovea, may be produced. Conceptually, the fovea is made up of the trajectory of velocity segmentations for the object over time.

As explained in connection with FIGS. 10-16, one key difference between conventional, analog NM systems and the disclosed embodiments is that conventional, analog NM cameras generate a single spike for each pixel or photoreceptor included in the camera. Thus, each pixel provides data for generation of a corresponding spike in a one-to-one relationship. As a result, analog NM systems require high frame rates to generate sufficient spike data for subsequent analysis of edges and the like.

To the contrary, in accordance with the presently disclosed embodiments, the output data generated from individual pixels or photoreceptors are combined and considered when generating spike data. Thus, data generated by pixels located near a particular pixel may be taken into consideration when generating spike data for that particular pixel. As a result, and explained below in more detail, spike data generated by the disclosed embodiments takes into consideration data generated by a neighborhood of pixels. The technical effect of this distinction is far reaching for accuracy, processing speed and image data applications.

However, prior to documenting the technical utility and effect of the presently disclosed digital NM vision system over conventional analog NM cameras, an explanation of the functionality and limitations of conventional image processing techniques provides technical context. Accordingly, a brief explanation of conventional image processing techniques and the corresponding limitations and utility of those techniques is provided so as to highlight the technical complexity of NM vision and the utility of the presently disclosed implementation of digital NM vision.

Conventional image processing is based on frame-by-frame processing and excludes temporal information in the scene. For example, conventional image processing of video data processes each frame of a video sequence while excluding temporal information. Thus, while an input photographic image may provide data relevant to analyzing a scene depicted in the input photographic image, conventional image processing systems do not or cannot utilize all the data provided in the image. This severely limits the ability for image processing systems to analyze temporal data included in image data.

For example, conventional pixel-level labelling tasks, e.g., by semantic segmentation used conventionally for image recognition, have a limited capacity to differentiate and delineate objects within an input image. Accordingly, the limitations of such approaches also impede the ability to use deep learning techniques for image recognition and object tracking. The technological limitations resulting from that omission and the value of taking into consideration the relationship between spatial and temporal information and resolution is discussed further herein in connection to FIG. 11 herein.

Conventionally, segmentation using Convolutional Neural Networks (CNNs) and Conditional Random Fields (CRFs)-based probabilistic graphical modelling has been used to formulate mean-field approximate inferences for CRFs with Gaussian pairwise potentials as Recurrent Neural Networks (RNN). Such networks, conventionally referred to as CRF-RNNs, have been used to improve image processing using deep networks. However, the resulting image data is still lacking. Likewise, ground truth segmentation data for the same input image data may also be lacking.

Figure 3:
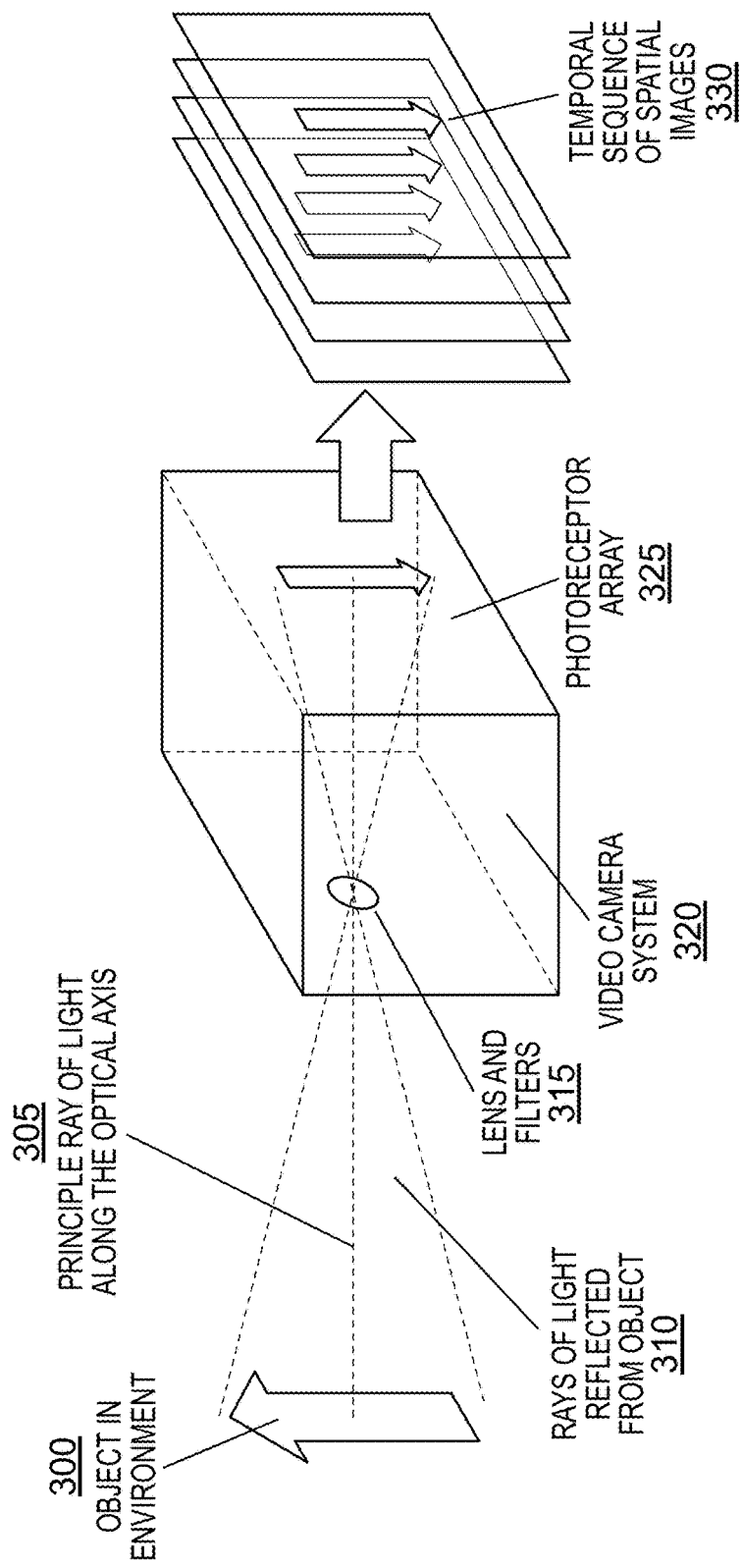
FIG. 3 is an illustrative embodiment for explaining limitations of conventional video camera and is provided to explain its operation and limitations.

FIG. 3 further illustrates the limitations of conventional video camera 320 and is provided to explain its operation and limitations. As shown in FIG. 3, a video camera 320 senses rays of light 305, 310 reflected from an object 300 in an environment. A lens 315 focuses the rays of light onto a photoreceptor array 325 and the camera 320 may include filters for filtering the light as well. The photoreceptor array 325 converts the light energy into a spatial digital image. As a result of camera operation, a temporal sequence of images 330 representing changes in the environment is output. This is the conventional operation of video cameras in general which results in a temporal sequence of spatial images with no mechanism to differentiate subsequent analysis of image data included in that sequence of frames.

Figure 4:
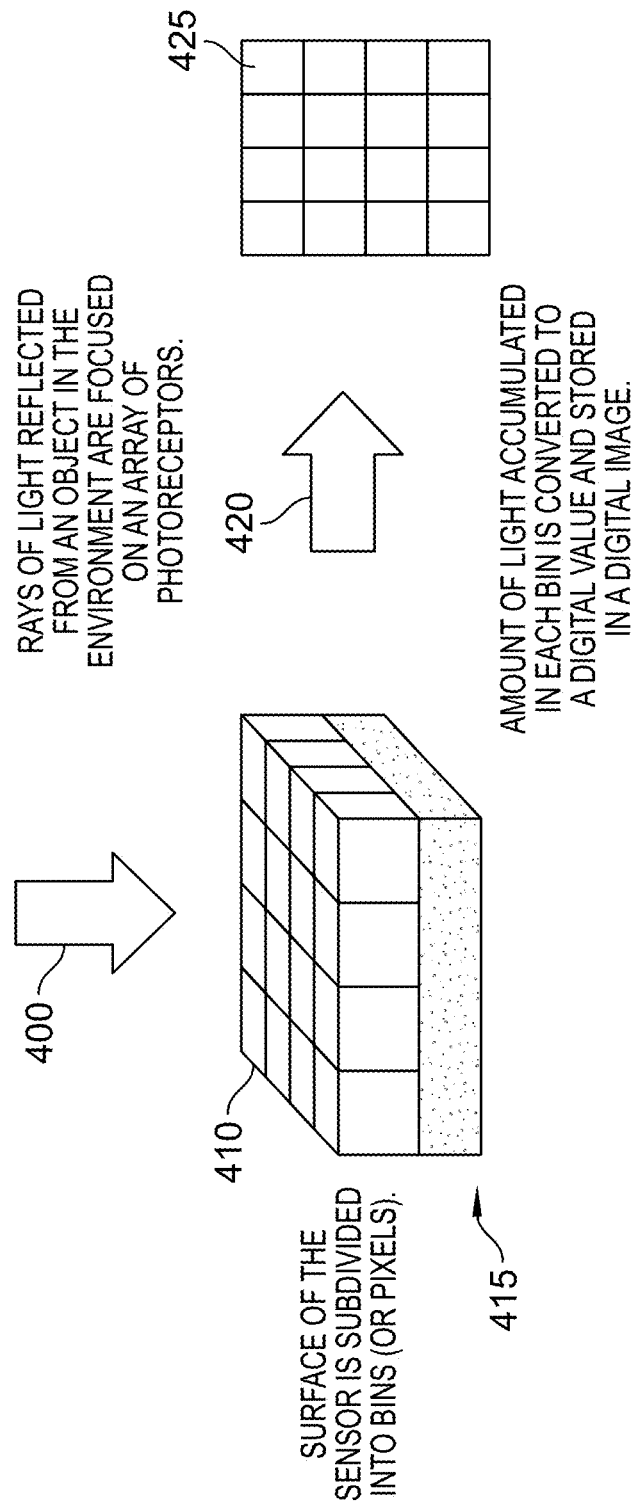
FIG. 4 is an illustration of an exemplary operation of a gray-level video camera.

As illustrated in FIG. 4, a gray-level video camera focuses rays of lights 400 onto a surface of photoreceptors 410. The surface 410 of the photoreceptor array sensor 415 is subdivided into bins (or pixels). The amount of light accumulated at each bin (or pixel) of the photoreceptor 410 is converted to a digital value 420 and stored in digital image 425 at the pixel corresponding to each photoreceptor bin (or pixel).

Figure 5:
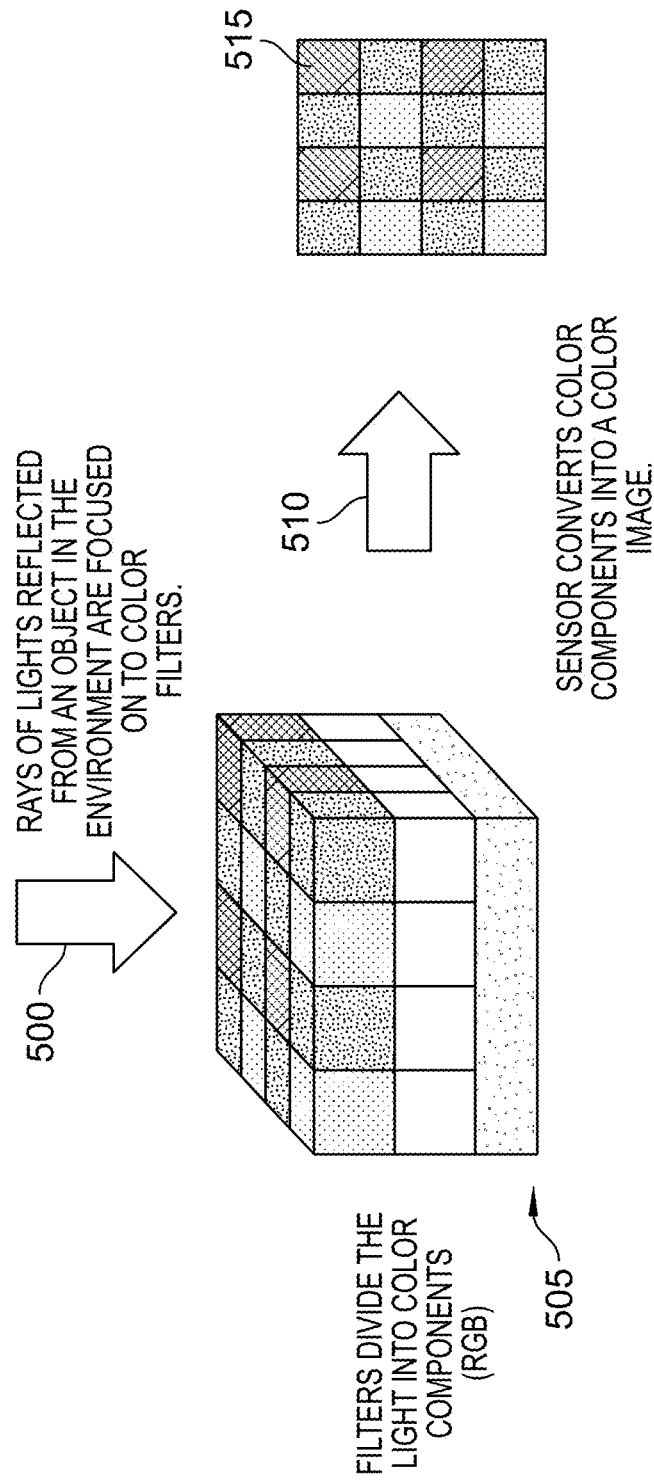
FIG. 5 illustrates an exemplary configuration of a conventional color video camera.

Likewise, FIG. 5 illustrates an exemplary configuration of a conventional color video camera. In operation, like in FIGS. 3 and 4, rays of light 500 reflected from an object in an environment are incident on a surface of a photoreceptor array 505. However, filters included in the color video camera include filters which divide the incident light into color components (e.g., red, green, and blue components). The filtered rays of light are then focused on to the photoreceptor array, in the same way as FIG. 4, and the photoreceptor array converts the color components into a digitized color image 510 for output. In this way, the sensor array 505 converts color components into a color image 515.

Figure 6:
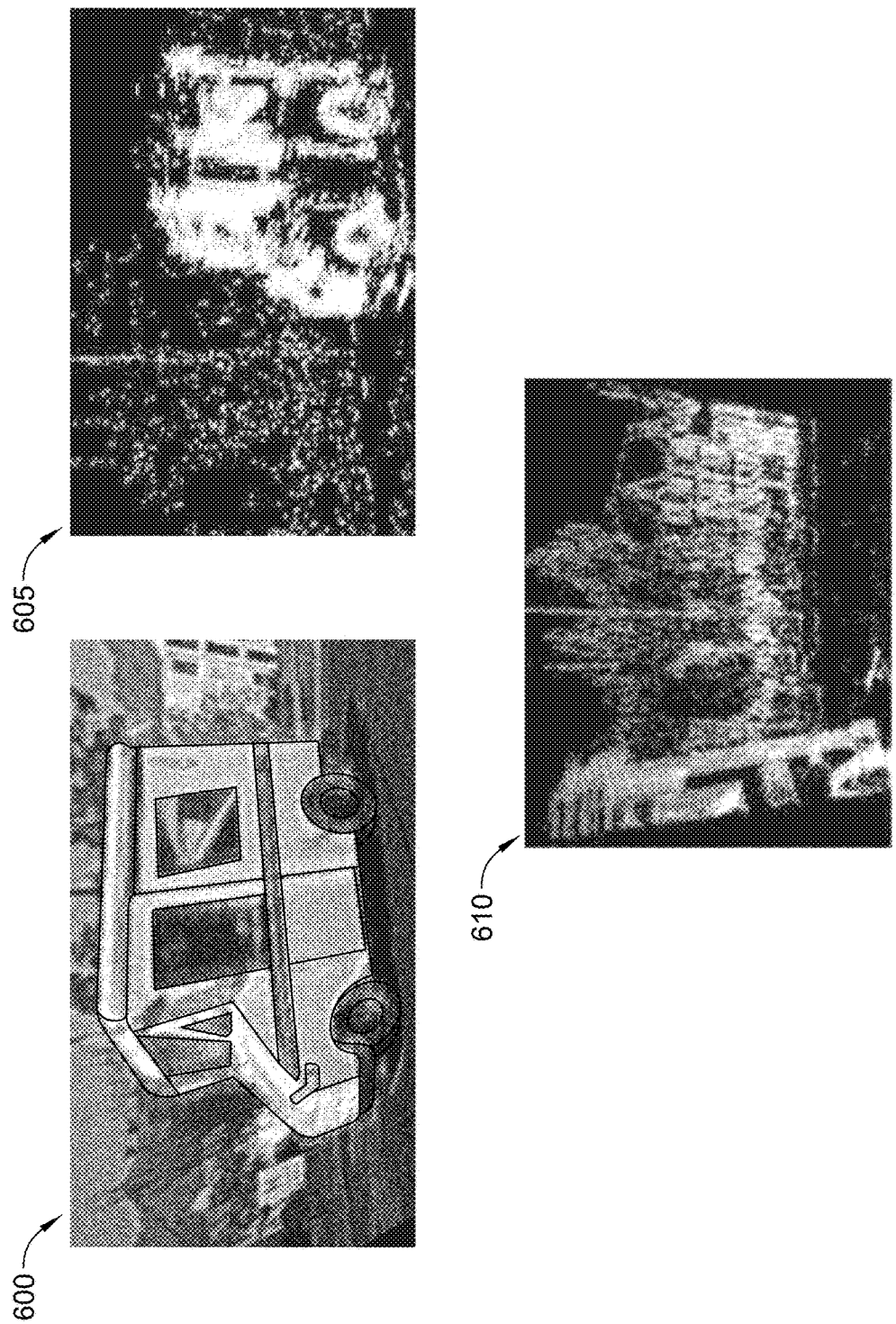
FIG. 6 illustrates an exemplary configuration and operation of analog NM camera operation.

To better understand the innovative concepts disclosed herein with relation to NM vision, a brief explanation of analog NM camera operation is now provided. As shown in FIG. 6, use of analog 2D NM cameras produces output data 605 from relative movement that is sparse but highly relevant. As a result, the static, non-changing parts of an input image 600 may be automatically excluded and only relevant image information related to changes in the scene may remain as shown at 605 and 610. Because, analog 2D NM cameras extract and output relevant and sparse motion information, such NM cameras have particular utility for early detection of start/change of movement. Further, analog 2D NM cameras are effective for use in logarithmic pre-amplification of image intensity, temporal-gain adaptation, edge detection, and 2-D motion detection at the imaging plane.

Figure 7:
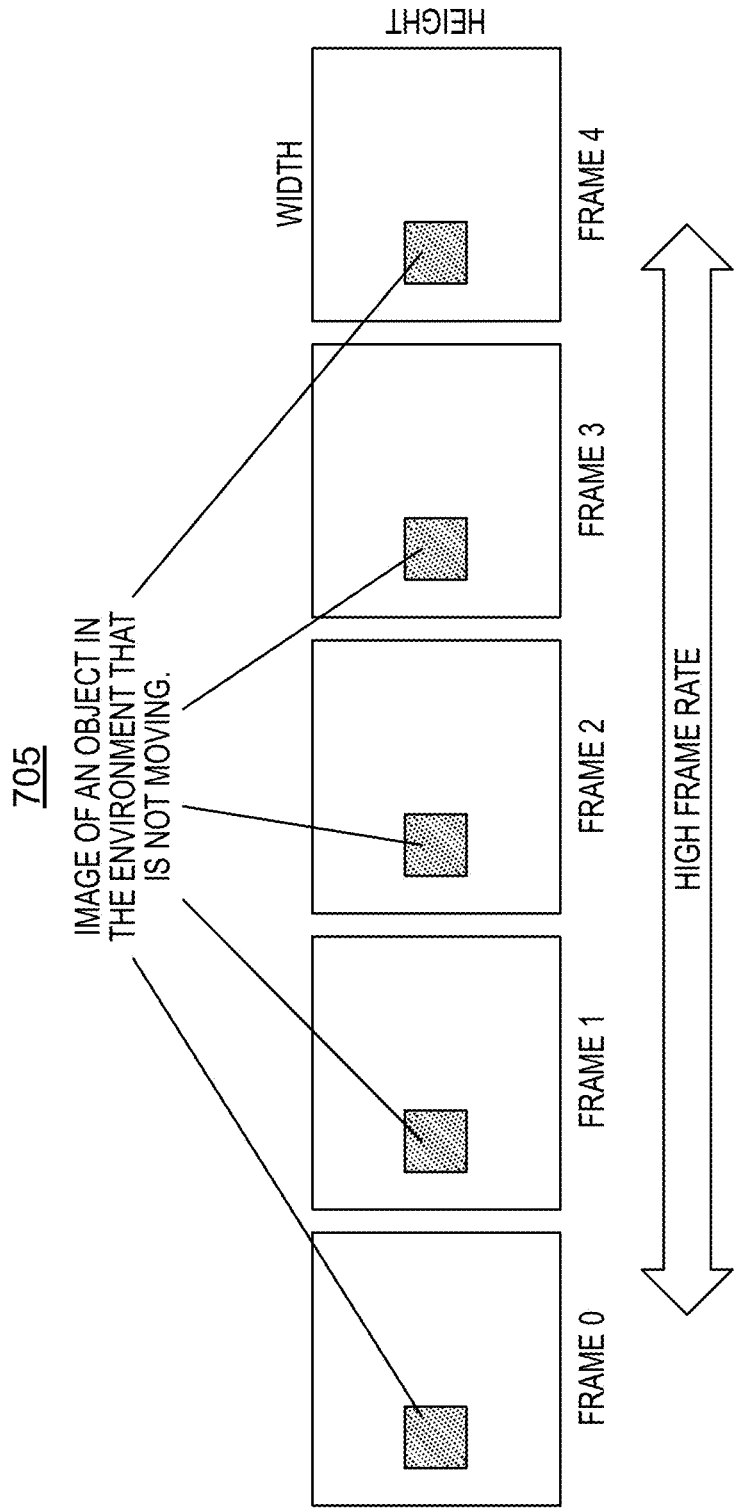
FIG. 7 provides a diagrammatic view of an output of a conventional video camera (non-NM) that is stationary relative to the environment sensing an object that is also stationary relative to the camera.

In contrast, FIG. 7 provides a diagrammatic view of an output of a conventional video camera (non-NM) that is stationary relative to the environment sensing an object that is also stationary relative to the camera. As shown in FIG. 7, the camera outputs a sequence of image frames, depicted as gray squares, 705, with the same size (width and height) at a high frame rate in frames 0-4. Because the object and the camera are stationary, the video camera outputs similar and redundant image frames at a high frame rate resulting in a high data rate but no additional spatial data content other than what was included in frame 0.

Figure 8:
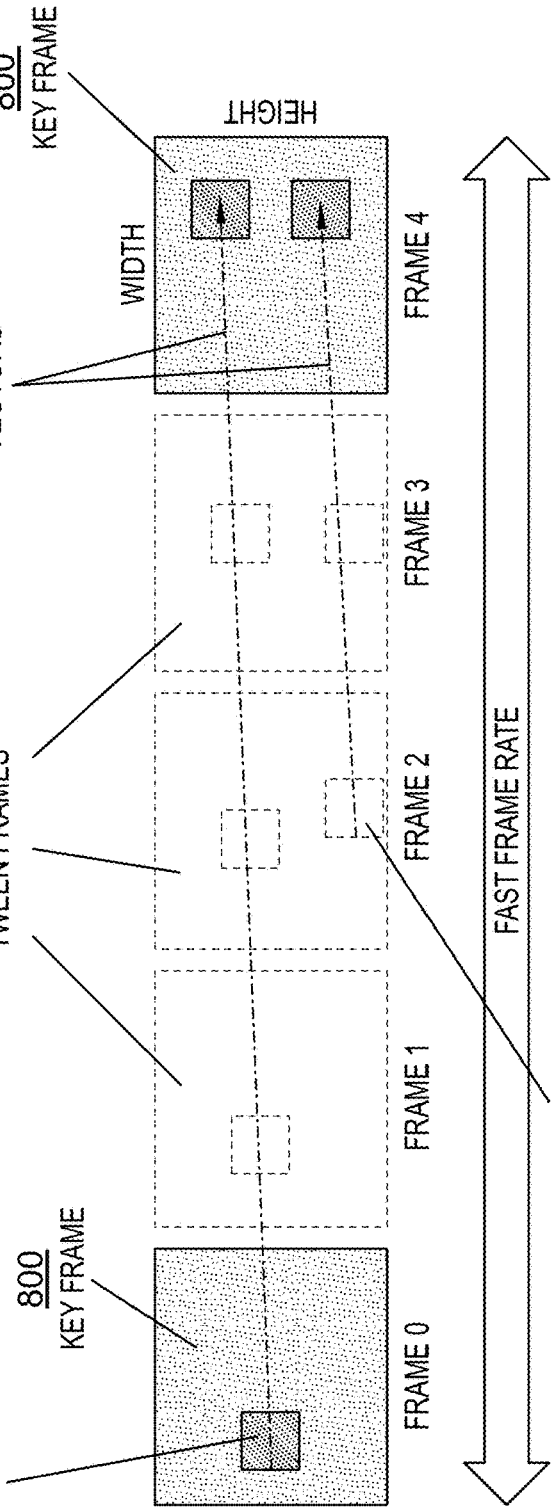
FIG. 8 provides a diagrammatic view of the output of a conventional video camera that is stationary relative to the environment and sensing two objects in the environment in a series of frames 0-4 moving from the lower-left to the upper-right at a high frame rate.

This issue of a large amount of data is further compounded when attempting to use a fast frame rate to compute motion vectors for computer vision applications. As shown in FIG. 8, a diagrammatic view is provided of the output of a conventional video camera that is stationary relative to the environment and sensing two objects in the environment in a series of frames 0-4 moving from the lower-left to the upper-right at a high frame rate. The conventional video camera outputs a sequence of images depicting the movement of each object.

Assuming the image sequence is arbitrarily subdivided into key frames 800 (frame 0), 800' (frame 4) and tween frames 810 (frames 1-3), then, intuitively, detecting and tracking the objects' motion appears straightforward by viewing the key frames along with the tween frames. This is particularly true when the spatial resolution (width and height) and the temporal resolution (frame rate) are high relative to the speeds of the objects depicted in the frame data. However, that ease of detection and tracking is completely dependent on analysis on high resolution, high frame rate data including relatively low object speeds. This dependency significantly limits the application and utility of detecting and tracking objects in this way.

With the understanding of the operation and shortcomings of conventional video technology (discussed with reference to FIGS. 7-8) in mind, disclosed embodiments are based, at least in part, on NM vision theory which recognizes that an image sequence of objects output from a conventional video camera provides data that may be cumulative and unnecessary for further processing. Developers of conventional analog NM cameras have recognized that the use of NM techniques provide some degree of improvement upon conventional video cameras because NM prioritizes changing data and de-prioritizes static data.

Figure 9:
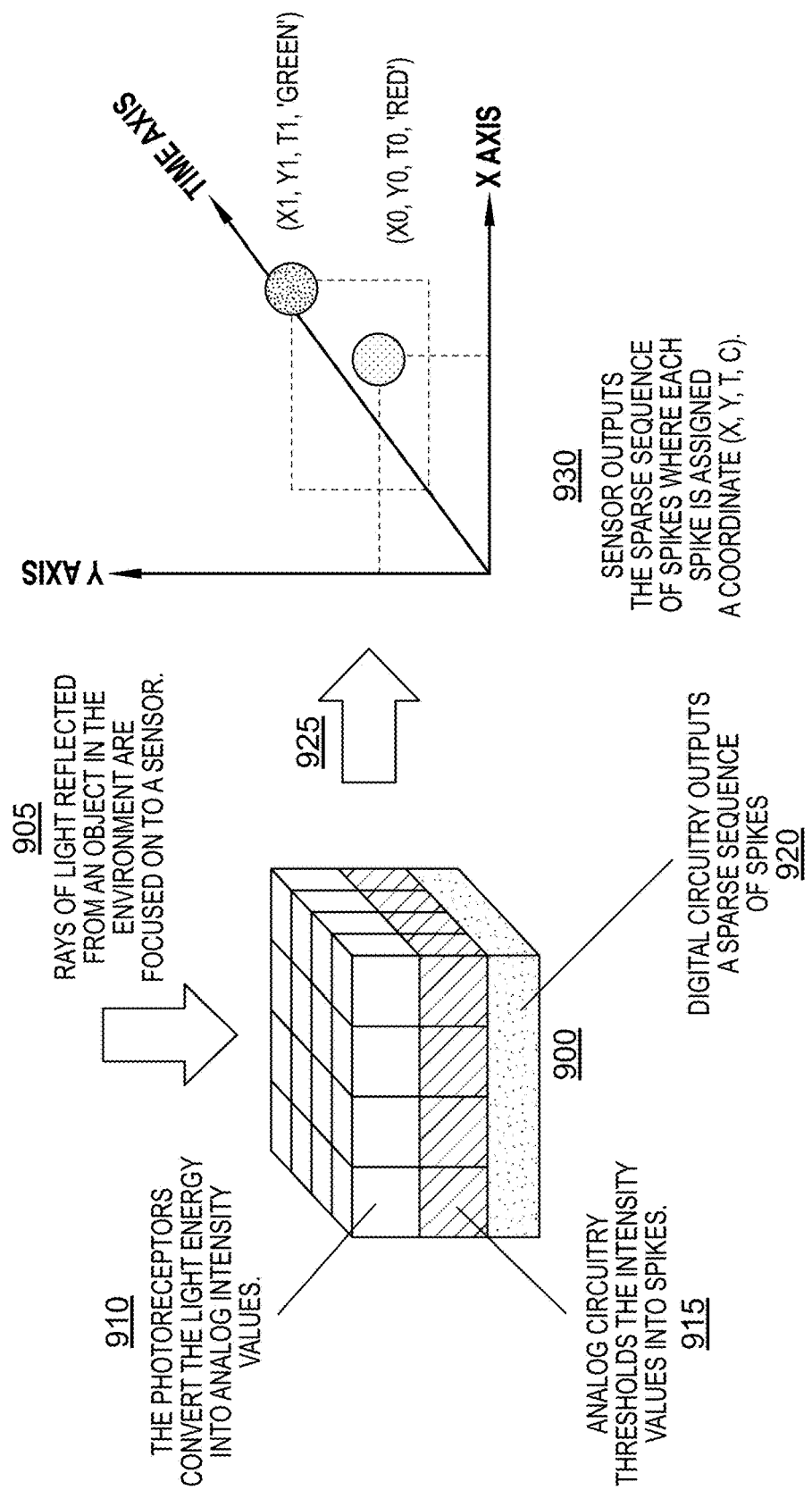
FIG. 9 provides an illustrative diagram for explanation of conventional analog NM camera operation.

NM vision is based on the recognition that not all frame data, and moreover, not all frames include information that is required for all image processing operations. More specifically, motion vectors may be computed using only key frames as shown in FIG. 9, which illustrates analog NM camera operation. As shown in FIG. 9, rays of light from reflected objects in the environment are focused on an array of photoreceptors. Each photoreceptor converts the light energy into proportional analog intensity values. Analog circuitry may be added to each pixel to generate an output sequence of spikes on a one-to-one basis. That circuitry generates a spike whenever the intensity value exceeds a threshold. Thus, when a spike is generated, the old intensity value may be updated with the new intensity value. In accordance with analog NM technology, each spike can be assigned a spatial-temporal coordinate (x, y, t, c) where (x, y) is the spatial location of the photoreceptor in the image, (t) is the timestamp when the threshold was exceeded, and (c) represents the polarity of the spike.

Figure 10:
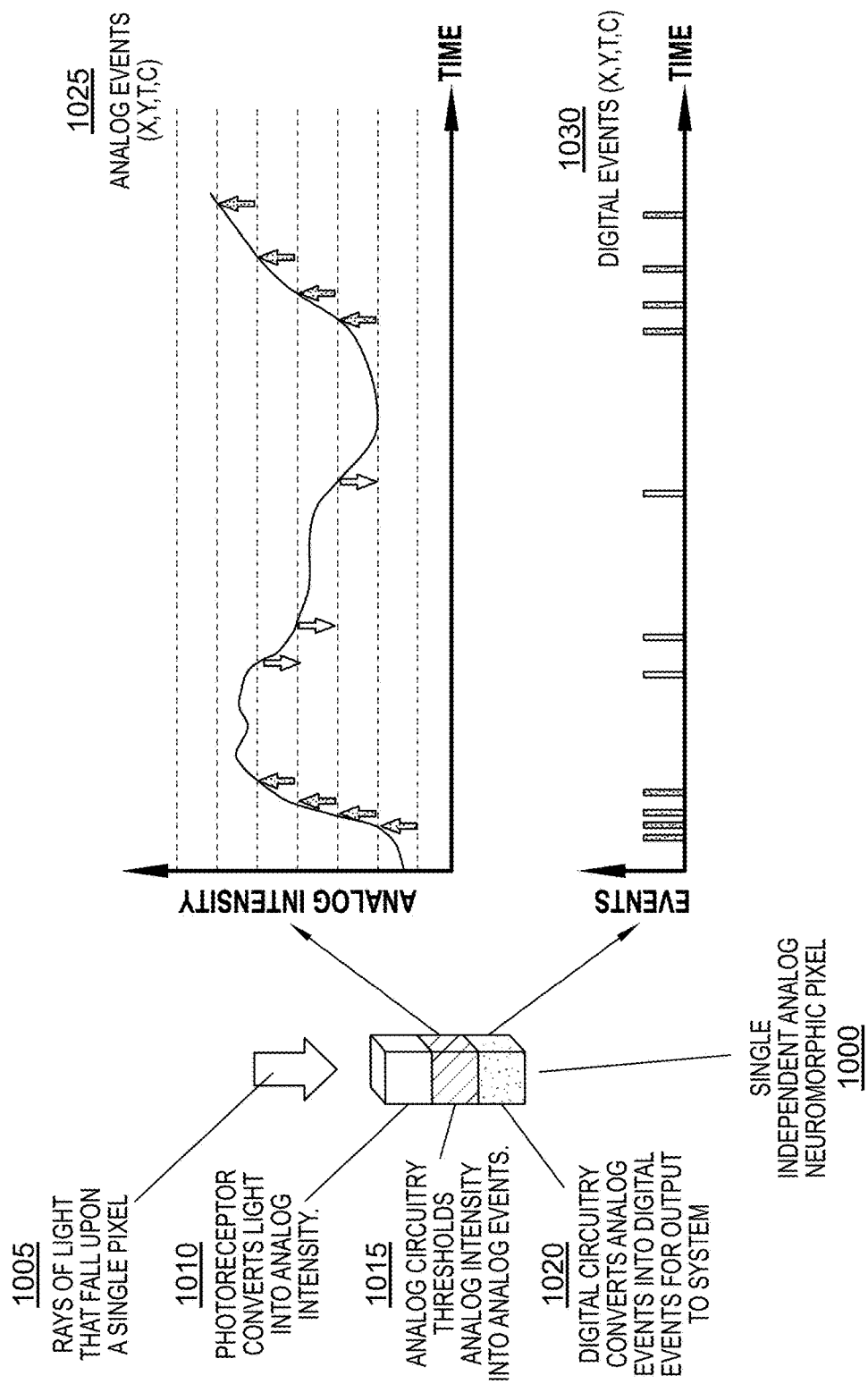
FIG. 10 provides a diagrammatic view of the operation of a single analog neuromorphic pixel.

FIG. 10 provides a diagrammatic view of the operation of a single analog neuromorphic pixel. Similar to a conventional sensor, rays of light reflected from objects in the environment are focused onto the photoreceptor. The photoreceptor converts the light energy into an analog intensity. Additional analog circuitry is added to each pixel to threshold the analog intensity into analog spikes. The upper graph illustrates how an analog intensity is thresholded. A green spike (depicted with a green arrow) is issued whenever the analog intensity transitions a threshold with a positive slope and a red spike (depicted with a red arrow) is issued whenever the analog intensity transitions a threshold with a negative slope.

Analog neuromorphic pixels operate independently of each other and threshold the log of the analog intensity in order to maximize dynamic range. An advantage of the analog neuromorphic camera is that high effective frame rates can be achieved while maintaining a significantly low data rate because the generated spikes are sparse. The spikes from an analog neuromorphic camera tend to preserve information about the relative movement of the objects in the environment relative to the camera.

However, conventional, analog NM cameras are only capable of capturing two-dimensional (2D) events. This is because, as explained above, analog neuromorphic pixels operate independently of each other and threshold the log of the analog intensity in order to maximize dynamic range and there is a one-to-one correlation between each pixel or photoreceptor used in an analog NM camera and the corresponding software that simulates operation of a Retinal Ganglion Cell (RGC). RGCs are neurons located near the inner surface of the retina of the eye that receive visual information from photoreceptors and collectively generate image-forming visual information from the retina in the form of action potential or nerve impulses. In the study of the human eye-brain machine, that action potential is often referred to simplistically as "spikes;" as a result, the term "spikes is used herein to refer to data generated by components simulating operation of RGCs for the purpose of performing NM vision.

To the contrary, the presently disclosed embodiments utilize additional structure and techniques to enable analysis of NM image data to identify spatial and temporal data that enables three-dimensional (3D) analysis as well and associated image processing analysis. This is in part, based on the shift from an analog implementation to a digital implementation provided by the disclosed embodiments. That shift enables alters the relationship between pixels (photoreceptors) and structure for synthesizing RGC operation from one-to-one (Pixel-to-RGC) to many to one (Pixels-to-RGC). That shift enables communication and consideration of data generated by a plurality of pixels when generating spike data.

That shift alters vision data generation in a manner that is akin to the difference between how the fovea centralis of the eye operates (foveal vision) and how parts of the eye outside the fovea centralis operate for peripheral vision. More specifically, the human eye includes two types of photoreceptors: cones and rods. The fovea centralis is a small depression in the retina of the eye where visual acuity is highest. The center of the field of vision is focused in this region. The fovea centralis is where retinal cones (photoreceptors for color detection) are particularly concentrated. The fovea centralis does not include rods (photoreceptors more sensitive than cones but unable to detect color).

Conventional, analog NM vision systems operate in the same manner as the foveal centralis region, wherein there is one-to-one correspondence between photoreceptors and RGC. To the contrary, disclosed embodiments of the digital NM vision system synthesize operation of the photoreceptors in the region outside the fovea centralis. In that area of the eye, neurons provided between the photoreceptors and the RGCs enable "cross-talk" or communication and consideration of photoreceptor data from nearby, neighboring and/or near photoreceptors prior to that data being used to generate spike data by the RGCs. In the human eye, this "cross-talk" appears to enable generation of different data by the RGCs than is generated by the RGCs in the foveal centralis region. Likewise, the digital NM vision system of presently disclosed generates different data than that generated by analog NM vision systems in that the digital NM spike data is based on more comprehensive data.

Figure 11:
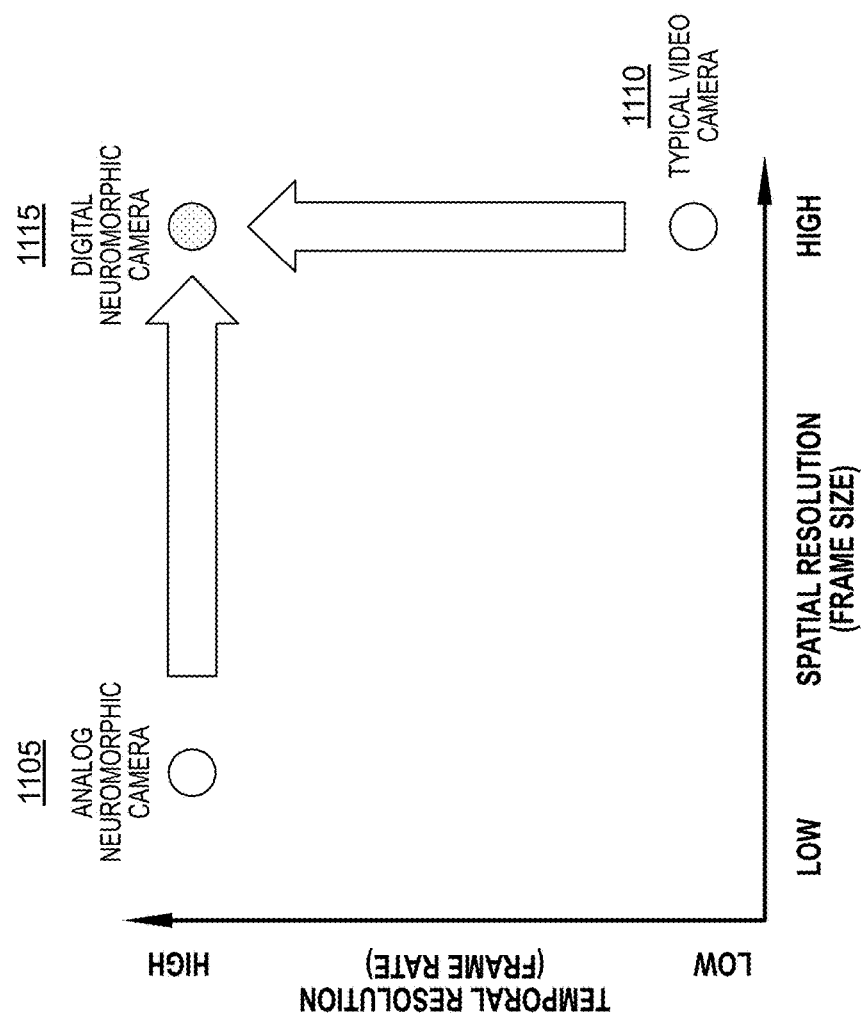
FIG. 11 demonstrates the advantages of a digital NM vision system provided in accordance with the disclosed embodiments over both a conventional, analog NM camera and a typical video camera.

FIG. 11 demonstrates the advantages of a digital NM vision system provided in accordance with the disclosed embodiments over both a conventional, analog NM camera and a typical video camera. The graph plots the technologies as a function of spatial resolution (frame size, e.g., pixels per square area unit) versus temporal resolution (frame rate, e.g., Hertz).

As is known generally, the ease of detection and tracking using conventional camera technology is completely dependent on analysis on high resolution, high frame rate data including relatively low object speeds. However, this dependency significantly limits the application and utility of detecting and tracking objects because of the large amounts of data to be analyzed.

For example, most commercially available video systems today are deemed to be high resolution and, therefore, generate a large amount of data. For example, even a gray-scale camera that outputs 2K×2K pixel images, at a rate of 1000 frames per second, requires an output bandwidth of 4 GB per second. However, such high frame rates create a problem regarding the amount of data generated. For example, the gray-scaled camera data produces by the equipment illustrated in FIG. 4 would fill a 32 GB SD card every eight seconds. For color images, such as that produced by the equipment illustrated in FIG. 5, the problem is further exasperated because the required output bandwidth for a color video camera is 12 GB per second.

Moreover, the large quantity of data produced by such conventional systems not only causes storage challenges but also challenges regarding processor capabilities for analyzing such data in an effective manner. For example, such a large amount of generated data may not be useful for equipment automation, machine learning, driver assistance or autonomous driving applications if the data cannot be analyzed in a timely manner to provide direction and/or control.

As explained above, such disadvantages are at least partially addressed by use of analog NM cameras. However, such cameras still require a relatively high effective frame rate. Moreover, analog NM cameras suffer from the additional disadvantage of the cost (monetary and spatial) of adding substantial analog circuitry to each pixel (because it operates on a pixel basis only) in order to generate the sparse events. This disadvantage of requiring additional and custom analog circuitry for each pixel/photoreceptor limits the spatial coverage and resolution of the images as compared to conventional, off-the-shelf image sensors.

With these relative deficiencies and limitations of conventional video and analog NM imaging in mind, disclosed embodiments provide a digital implementation of NM vision image processing that minimizes or eliminates those issues. The shift from analog to digital implemented herein also enables the ability to reduce the data frame rate while increasing the acuity provided by the image generated by the vision system.

In accordance with at least one disclosed embodiment, relatively large frame sizes (e.g., 2048 by 2048 pixels) may be achieved by the digital NM system using "off-the-self" image sensor (e.g., Sony IMX252 Monochrome and Color CMOS Image Sensor) found in typical video cameras.

In accordance with at least one disclosed embodiment, relatively high temporal resolution (e.g., 1 millisecond) may be achieved by the digital NM system running such sensors at higher frame rates (e.g., 1000 frames per second) so as to exploit digital processing techniques to extract sparse motion events from the frames. In this way, the digital NM vision system may include a combination of software running in the digital NM detector 110 (e.g., the velocity transformer module 140 illustrated in FIG. 1) and one or processors running software on back-end to generate digital NM output (e.g., in the digital NM engine 145 of FIG. 1).

In accordance with at least one embodiment, digital NM output may include data generated and analyzed on a pixel-by-pixel basis generated using data generated by a plurality of pixels/photoreceptors so as to enable consideration of data generated by a neighborhood of pixels/photoreceptors. As such, the digital NM output may include spikes that pertain to an event in space-time that includes a local neighborhood of space-time statistics (e.g., including data indicating polarity, edge, images, etc.)

Returning now to the example of the presently disclosed digital NM vision system of FIG. 1, the illustrated example provides a 5D digital, NM vision system in that velocity vectors are computed for each pixel in an image. As shown in FIG. 1, a photoreceptor array 120 converts rays of light 105 reflected from objects in an environment into a temporal sequence of spatial images 125. A digital retina 130 converts the sequence of images into a sparse sequence of spikes 135. The velocity transformer module 140 uses the sequence of spikes 135 to generate velocity vectors 115 for each object in the scene.

Figure 12:
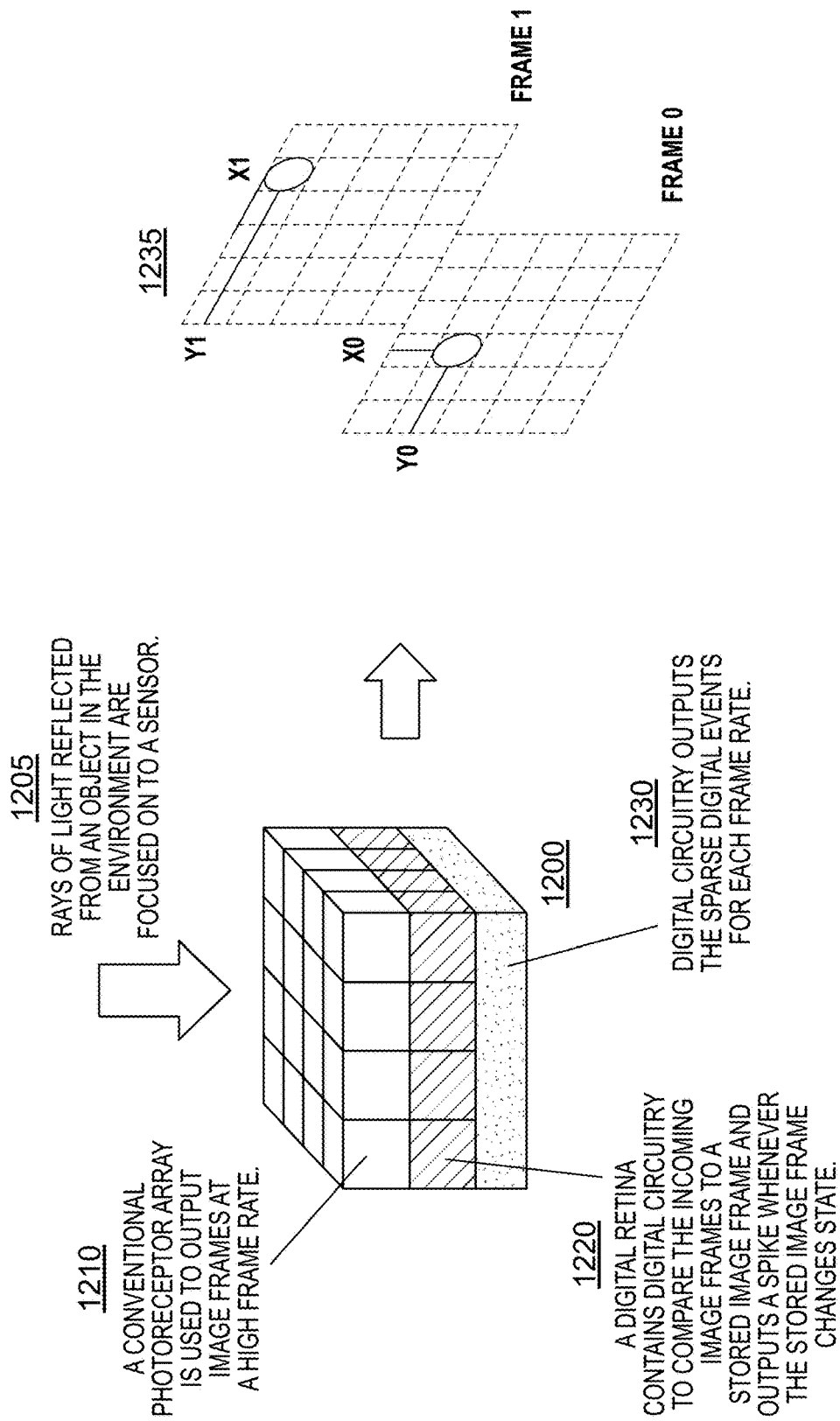
FIG. 12 shows a conceptual, illustrative view of a digital NM sensor provided in accordance with the disclosed embodiments.

FIG. 12 shows a conceptual, illustrative view of a digital NM sensor 1200 (corresponding to the example sensor 120 illustrated in FIG. 1) provided in accordance with the disclosed embodiments. The illustrative functionality corresponds to at least components 120 and 130 illustrated in FIG. 1. That digital NM functionality may be implemented using a conventional off-the-shelf photoreceptor array (e.g. CMOS sensor) to output image frames at a high frame rate (e.g., 1000 frames per second) at 1210. The functionality of the digital retina 1220 may be augmented with digital circuitry at 1230 that compares the incoming image frames to a store image frame. More specifically, whenever the intensity values of a pixel of the incoming image transitions a threshold in the corresponding pixel of the stored image, a digital spike may be issued and the corresponding receptor field area of the stored image may be updated to a current value. However, as explained above, that digital circuitry 1230 is further configured to take into consideration a plurality of pixels/photoreceptors so as to enable consideration of data generated by a neighborhood of pixels/photoreceptors. As such, the digital NM output from 1230 may include spikes that pertain to an event in space-time that includes a local neighborhood of space-time statistics (e.g., including data indicating polarity, edge, images, etc.)

It should be understood that the digital retina is not merely a bugger of images. Rather, the digital retina may be conceptually thought of as a temporal bookkeeper. This is because, every time a reference image changes, a spike is generated. Thus, operation of the digital retina enables documentation of when and how parts of an image change.

Figure 13:
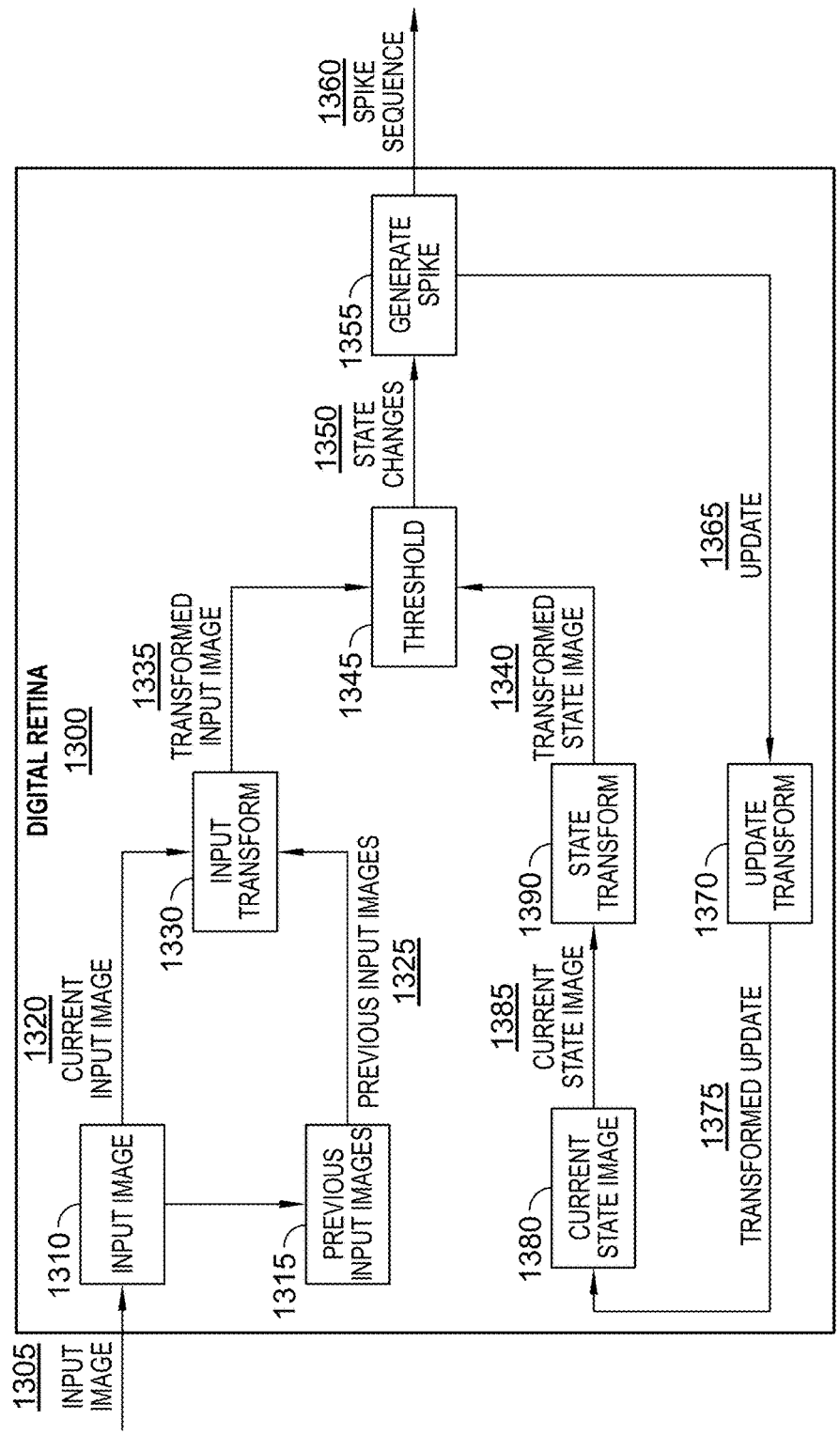
FIG. 13 illustrates one example of conceptual components of the digital retina provided in accordance with at least one disclosed embodiment in further detail.

FIG. 13 illustrates one example of conceptual components of the digital retina 130 provided in accordance with at least one disclosed embodiment in further detail. As shown in FIG. 13, the digital retina 1300 (corresponding to the example 130 illustrated in FIG. 1) receives input 1305 of an input image 1320 from the photoreceptor array while maintaining a history of previous input images 1315. The current input image 1320 and the previous input images 1325 are processed by an Input Transform 1330 to generate a transformed input image 1335.

Additionally, the current state image 1380 is a reference image that represents the most recent aggregation of all updates extracted from the input images in the form of spikes. The current state image, at 1385 is input into and processed by a State Transform 1390 to generate a transformed state image 1340.

The transformed input image 1335 and the transformed state image 1340 are compared and thresholded to generate state change data 1350. Each state change in the state change data 1350 generates a spike 1355 that is output in a spike sequence 1360 as well as an update 1365 to the current state image 1380 for subsequent use. More specifically, that update 1365 is processed by an Update Transform 1370 to generate a transformed update 1375. In this way, the transformed update 1375 is used to update the current state image 1380.

Figure 14:
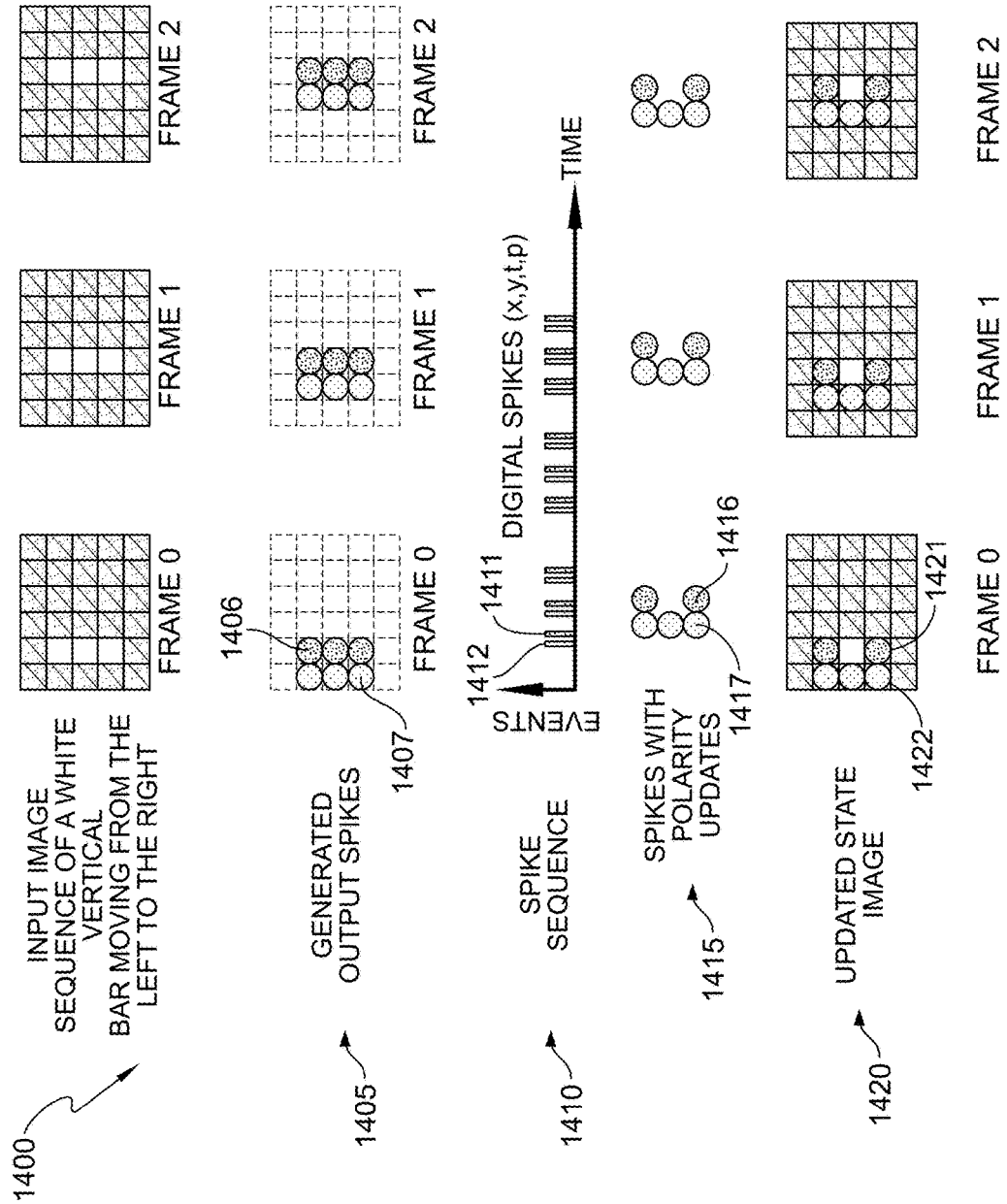
FIG. 14 illustrates conceptual, illustrative view of the functionality provided by components illustrated in FIG. 13.

FIG. 14 illustrates conceptual, illustrative view of the functionality provided by components illustrated in FIG. 13. FIG. 14 provides a diagrammatic view of a polarity spike sequence generated for a vertical white bar moving from the left to the right of the image at 1400. As shown in 1405, each image frame generates six polarity spikes with the leading edge generating three spikes 1406 and the trailing edge generating three spikes 1407. Those polarity spikes are used to update the stored state image. Each spike updates a single pixel.

The generated spikes, 1406 and 1407, are output as a sequence of event or digital spikes 1410. Each digital spike is defined by a spatial coordinate (x, y), timestamp (t), and polarity (p). The spatial coordinate is the location of the spike on the input image and the timestamp is derived from the timestamp of the input image frame. The polarity specifies whether the intensity of the reference image should increase or decrease. Thus, the digital spikes, 1412 and 1411 are the digital spikes output for the generated spikes 1407 and 1406 of Frame 0 in 1405. The spike sequence 1410 is also used to update the current state image. The spikes with polarity updates 1417 and 1416 are used to update the current state image at 1422 and 1421, resp. The green polarity spikes 1416 increase the intensity of its corresponding pixels in the current state at 1421 and the red polarity spikes 1417 decrease the intensity of its corresponding pixels in the current state image at 1422. The updates to the reference image 1422 and 1421 applied to the generated spikes of each frame 1407 and 1406 cause the current state image to transform to be similar to the input images over time.

In accordance with at least one implementation, the digital NM retina may be implemented in combination with may be implemented as an imaging sensor and/or sensor array that functions as a digital retina. The digital retina in combination with computation devices (CMOS, e.g., FPGA, GPU, etc.) may form a digital NM detector.

Figure 15:
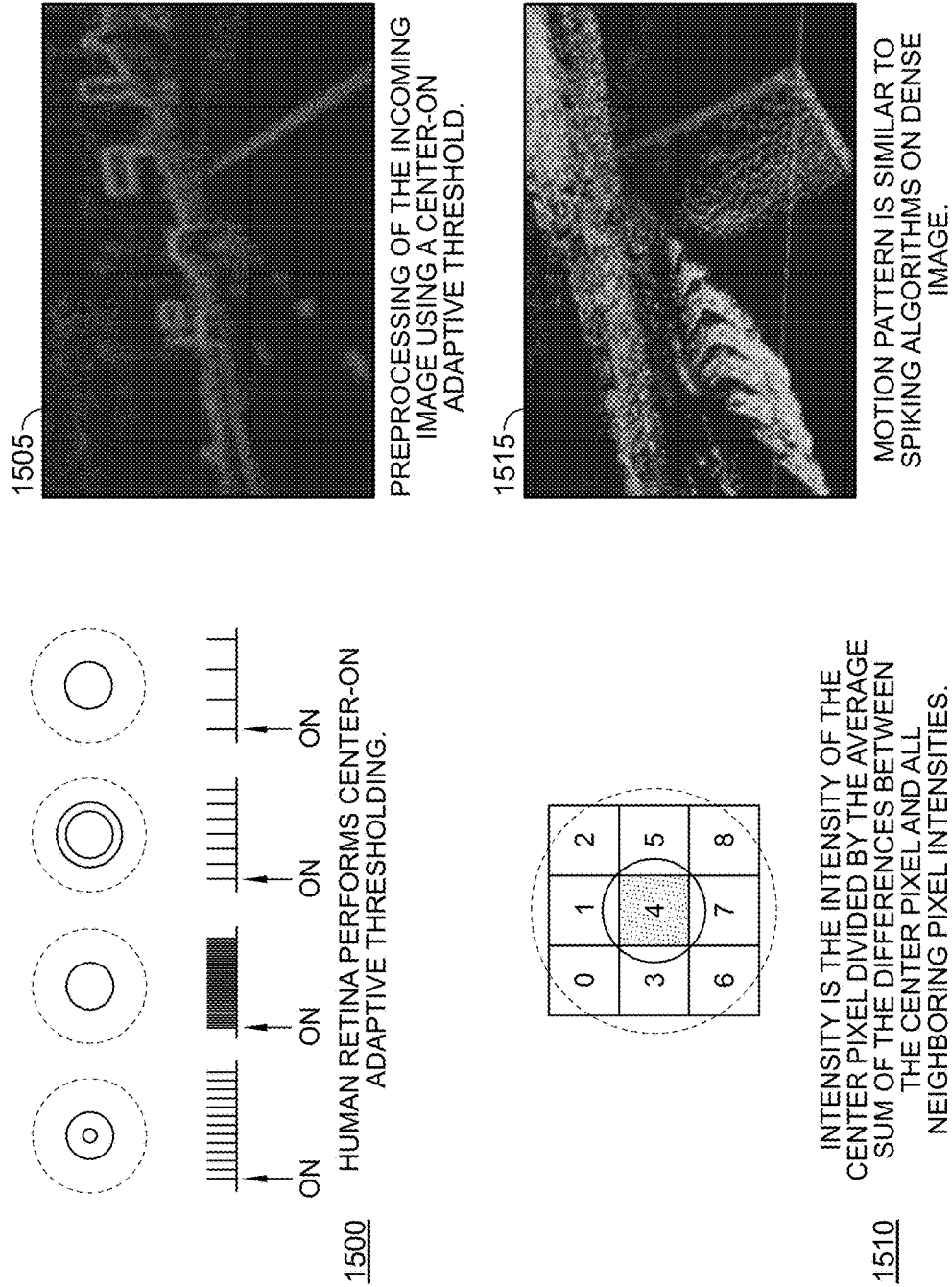
FIG. 15 illustrates a transformation of the input image using a center-on adaptive threshold.

FIG. 15 illustrates a transformation of the input image using a center-on adaptive threshold. The human retina performs center-surround adaptive thresholding on input images. A center-surround filter 1500 is defined by an inner ring and an outer ring. The center-surround filter is applied to the input image at 1510. There are two basic varieties of filters: center-on/surround-off, and center-off/surround-on. For center-on, surround off, the intensity of the center pixel is computed by subtracting the average intensity of the pixels in the inner ring from the average intensity of the pixels in the outer ring. For center-off/surround-on, the center pixel is computed by subtracting the average intensity of the pixels in the outer ring from the average intensity of the pixels in the inner ring. The resulting output of applying a center-surround to an input image is 1505. The resulting motion patterns of 1505 are similar to that of the original input images.

Figure 16:
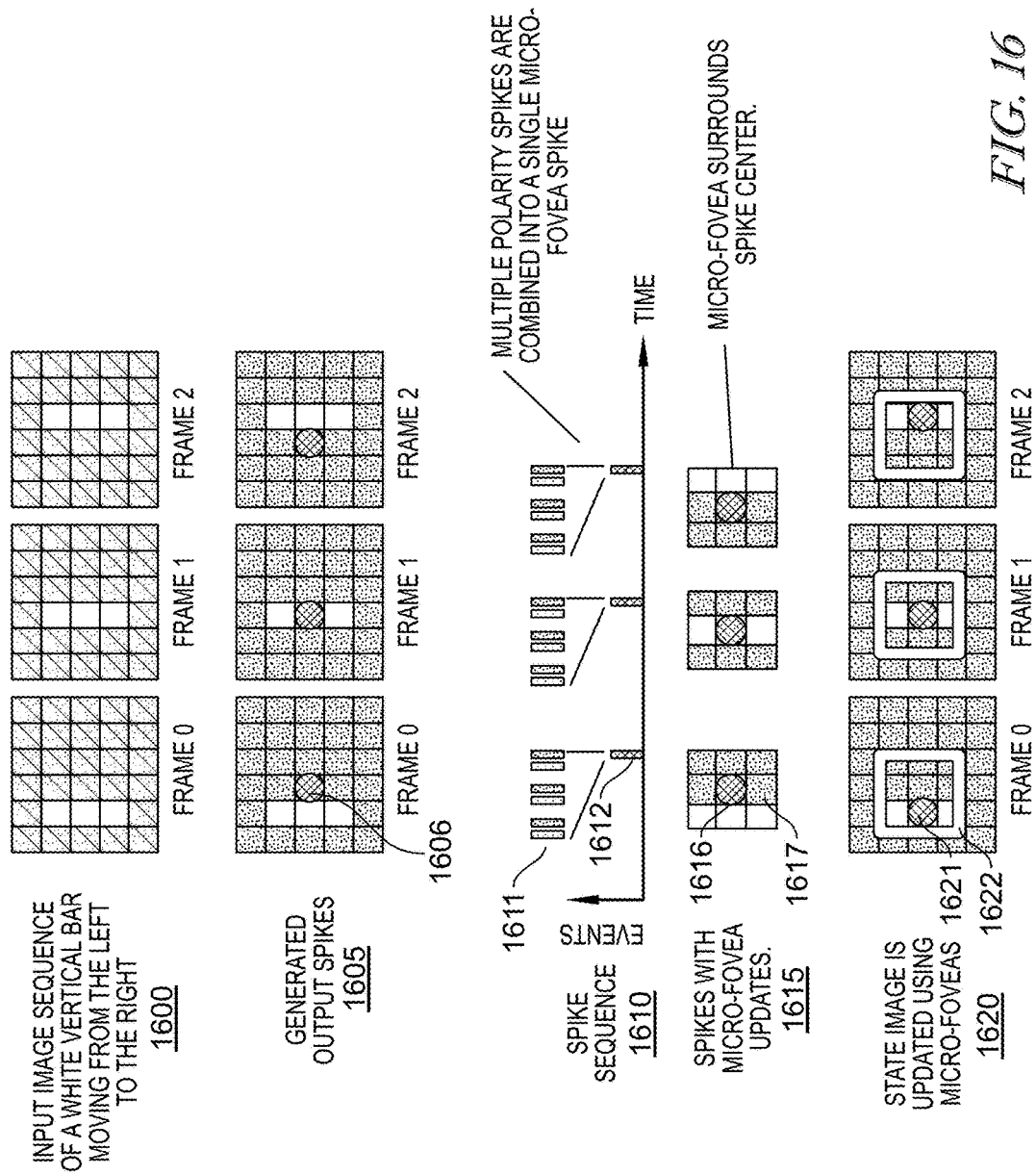
FIG. 16 provides an explanatory illustration of the utility provided in generating a micro-fovea spike sequence in accordance with disclosed embodiments.

FIG. 16 provides a diagrammatic view of a micro-fovea spike sequence generated for the same vertical white bar in FIG. 14 moving from the left to the right of the image at 1600. As in FIG. 14, output spikes are generated at 1605. However, for micro-fovea generation, each image frame essentially replaces the six polarity spikes 1611 with a single polarity spike that is a micro-fovea spike 1612 at 1610. Thus, at 1615, the resulting micro-fovea 1617 surrounds the spike center 1616 (which corresponds to the generated micro-fovea spike 1612) and contains all of the information about the update to the current state image (e.g. 1350 in FIG. 13). In this way, this information 1622 may be attached to the spike 1621 at 1620 and may be used to update the current state image by components of 1300 illustrated in FIG. 13.

Figure 17:
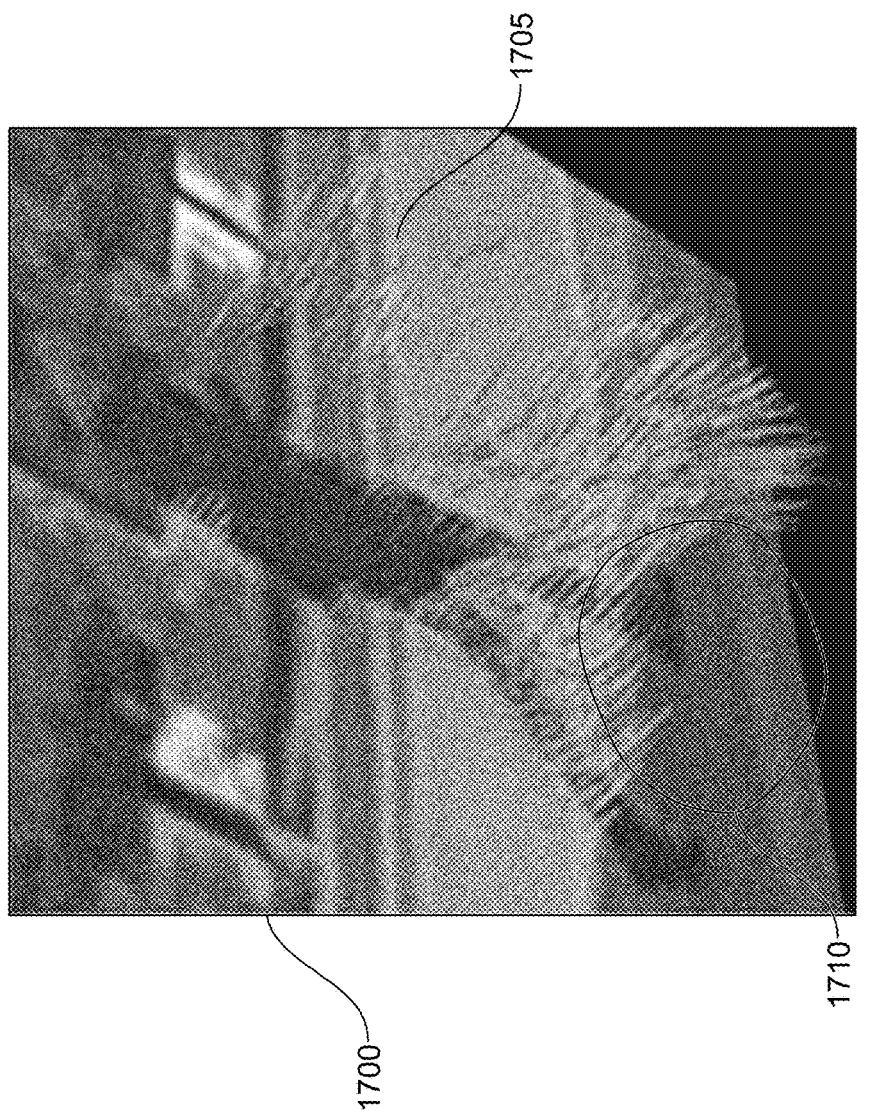
FIG. 17 provides an explanatory illustration of the utility provided in identifying spatio-temporal events via motion patterns within generated sequences of NM images.

As explained briefly above, in accordance with at least one embodiment, velocity vectors may be calculated for each pixel in an image. Such velocity vectors may be used to generate and analyze spatial-temporal dimensions. More specifically, a digital NM detector designed in accordance with the disclosed embodiments may generate a sequence of NM images that are particularly effective at illustrating spatiotemporal patterns. For example, as illustrated in FIG. 17, by rotating and/or skewing velocity space of the spatiotemporal events reveals clearly visible motion patterns in the underlying image sequence (e.g., video data). Thus, within a photographic image 1700, velocity vectors 1705 may be superimposed upon the image 1700 to illustrate the spatiotemporal relationships between motion depicted in an image sequence. Those velocity vectors 1705 may be colored differently depending the speed of associated with the vector, for example, the velocity vectors 1710 may be colored red, indicative of a minimum speed of 0 pixels/50 frames and a maximum speed of 5 pixels/50 frames. As shown in FIG. 20, the velocity vectors 1705 are indicative of the movement associated with the pedestrian's feet.

Thus, in at least one implementation, be differentiating colors of the vectors 1700, it is more readily apparent where the motion patterns occur. In one implementation, for example, the color red would be as indicated above, with the color yellow corresponding to a minimum of 5 pixel/50 frames and a maximum of 10 pixels/50 frames, the color green corresponding to a minimum of 10 pixel/50 frames and a maximum of 15 pixels/50 frames, the color cyan corresponding to a minimum of 15 pixel/50 frames and a maximum of 20 pixels/50 frames, the color blue corresponding to a minimum of 20 pixel/50 frames and a maximum of infinity pixels/50 frames with the color yellow corresponding to a minimum of 5 pixel/50 frames and a maximum of 10 pixels/50 frames.

As a result of analyzing the motion patterns, image data may be segmented based on detected velocity vectors. This enables the ability to better identify objects within a velocity space. With such data, the reference frames may be rotated and/or skewed to more clearly convey visible unique motion patterns within the data. Accordingly, such operations provide additional utility in that they enable improved separation of objects with different motion patterns from within input image data. Such technology may be used to provide strong indicators of occlusion as well as additional functionality detailed herein.

As explained above, the velocity vector data may be used to represent or characterize velocity space. That velocity space may, in turn be used to perform velocity segmentation to identify and differentiate objects. Velocity segmentation may be performed in any number of ways including using, for example, a feature-based approach that utilizes lower frame rate data (e.g., 30 frames per second), a relatively dense method, or sparse method that utilizes faster frame rates (e.g., 1,000 frames per second) relative to the motion being detected with a velocity being assigned to each pixel in an image.

Figure 18:
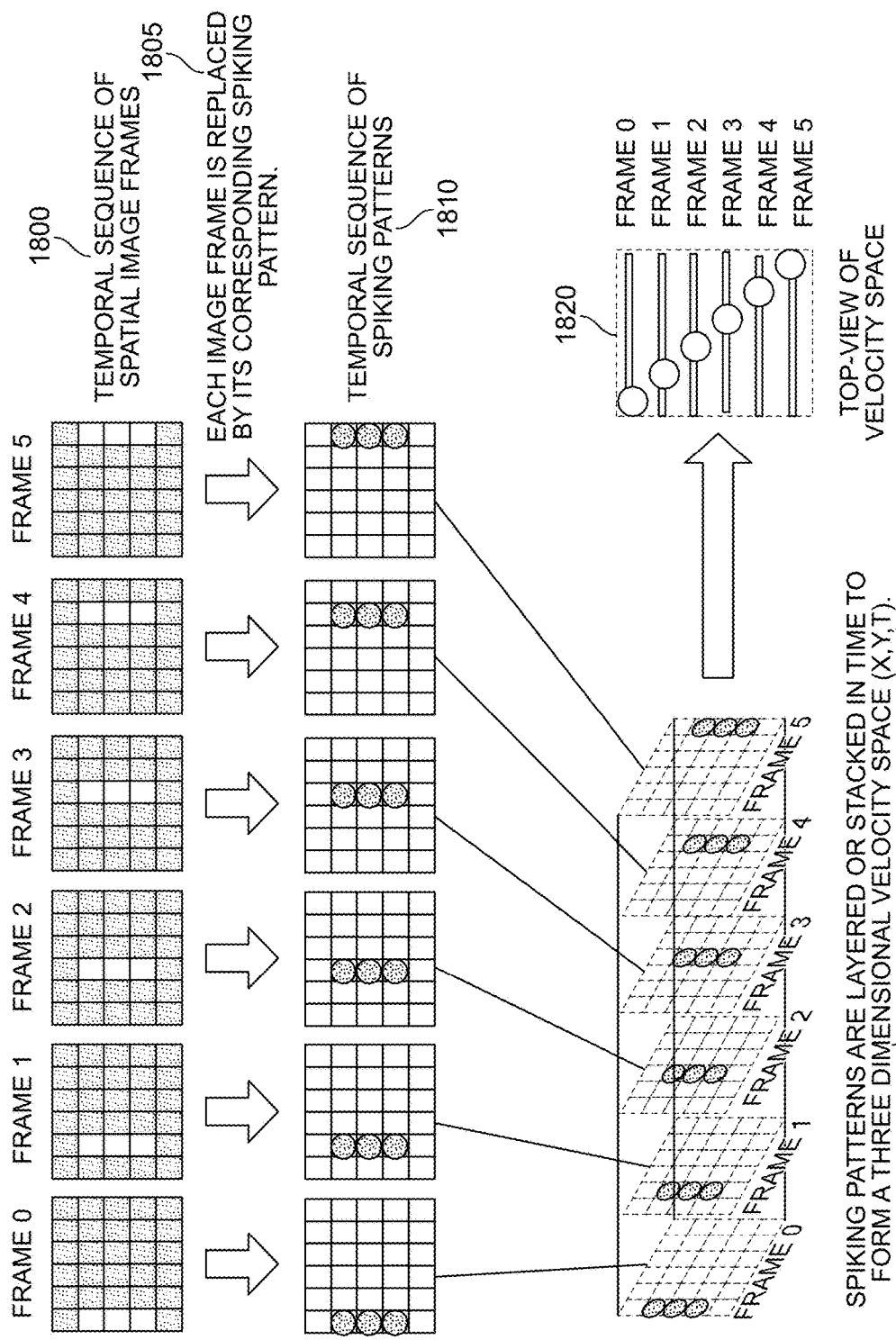
FIG. 18 illustrates an illustrative diagram useful in describing one exemplary process of constructing a velocity space.

FIG. 18 illustrates is an illustrative diagram useful in describing one exemplary process of constructing a velocity space. As shown in FIG. 18, a temporal sequence of spatial image frames may be analyzed at 1800 to replace each frame with a corresponding spiking pattern at 1805. Subsequently, the temporal sequence of the spiking patterns 1820 may be layered or stacked in time to form a three dimensional velocity space (x, y, t) at 1815. Such operations enable the ability to view the velocity space from alternative viewpoints, e.g., the top-view 1820 of the velocity space. Thus, through rotation of the velocity space alternative perspective is provided. In this way, a velocity of interest may be represented by rotating and/or skewing the velocity space to an angle that represents that velocity of interest. In accordance with at least one embodiment, this may be performed by projecting spikes onto a plane and performing a histogram in spatial bins of the data. This operation may be repeated for all angles of interest so as to obtain a complete data set for all velocities of interest in the velocity space. As a result, for each spike, a velocity vector is assigned to the bin with the maximum count and maximum trajectory length across all computed velocity angles.

The utility of such image data generation and processing is illustrated with reference to FIG. 17. The image data of FIG. 17 was generated at a speed measured as pixels traveled per 50 frames. The depicted pedestrian is traveling 17 pixels/50 frames to the right. Note green to cyan velocity vectors passing through spikes from the pedestrian's back. In the example of FIG. 17, the velocity space was rotated counter clockwise or clockwise depending on the direction of motion for the particular pixel. For predominately horizontal motion, the rotation was performed around the vertical (Y) axis.

For the scene depicted in FIG. 17, the velocity space was rotated counter-clockwise at angles corresponding to speed from 5 pixels/50 frames to 30 pixels/50 frames in increments of 5 pixels/50 frames. Each rotation was projected with perspective the spikes into a velocity screen space.

At each angle, the spikes falling on the same pixel column in the velocity screen space were counted and input into a histogram. The velocity screen space pixels columns with, for example, 80% of the maximum count, may be replaced with a velocity vector from the earliest spike in the column to the latest spike in that column. The resulting velocity vectors in the velocity space may then be plotted with color assignments. An example of that is illustrated in FIG. 17.

Figure 19:
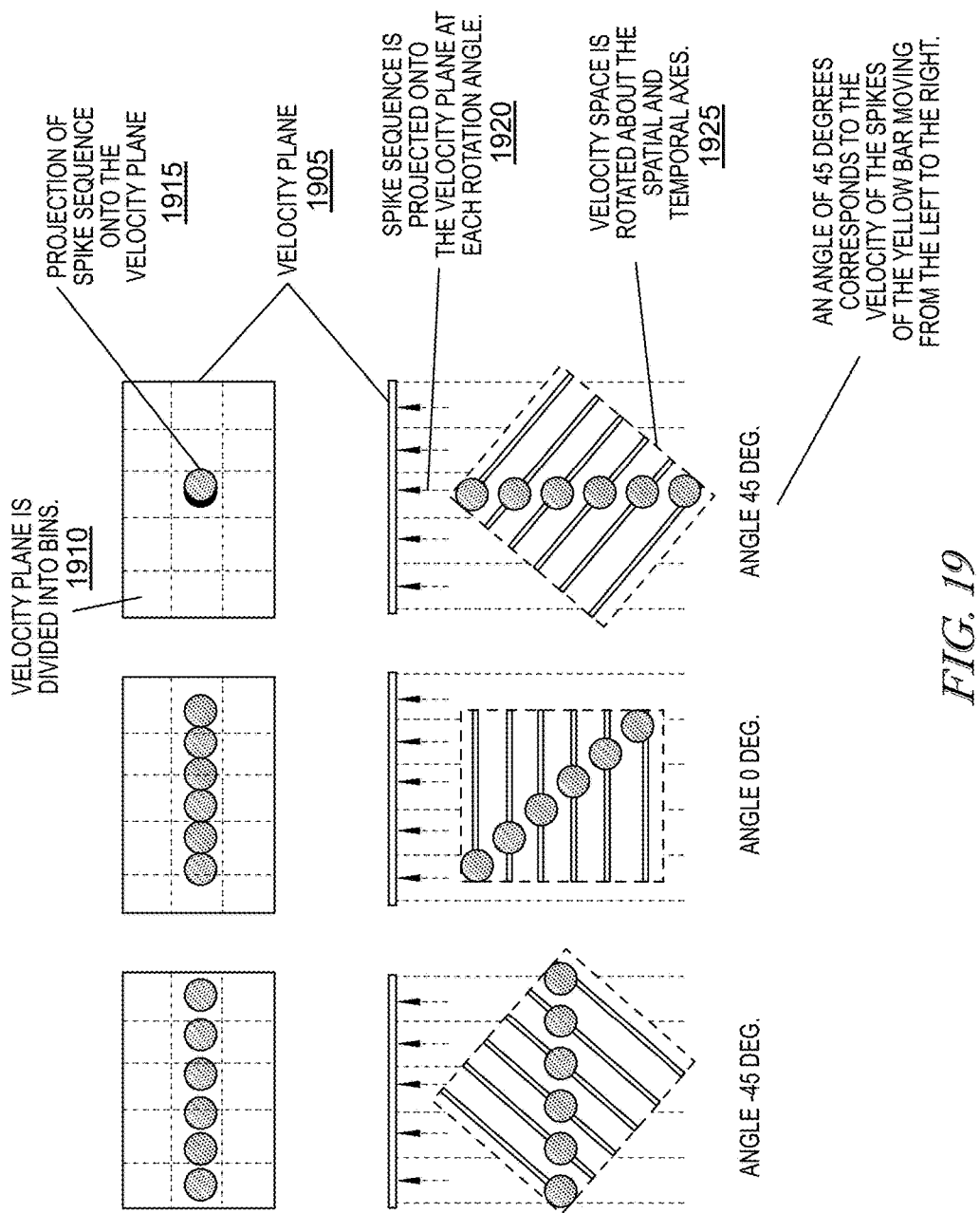
FIG. 19 illustrates one example of how spike data may be associated together to determine their velocity.

Although there are many ways of associating spike data to determine their velocity, FIG. 19 illustrates one example of how that may be performed. FIG. 19 illustrates an example of generating velocity vectors by rotating and/or skewing velocity space. Such velocity vector generation is particularly valuable for characterizing image data because such velocity vector data may be used to further identify foveas, and differentiate objects within that image data.

Accordingly, as shown in FIG. 19, velocity vectors may be generated in this way by first dividing a velocity plane 1905 into bins at 1910. A velocity plane may be conceptually thought of as two-dimensional histogram of projected spikes where the spike falling into a histogram bin are assumed generated from a point on an object moving at a speed as specified by the rotation angles of the velocity space.

As shown in FIG. 19, at the 0 degree angle of rotation, each horizontal black line represents a frame of video data with a representation of the object (the circle) from a top view as in FIG. 18. The circles represent object moving from left to right over time (from top to bottom).

A spike sequence may be projected onto the velocity plane 1905 at 1915. Subsequently, the spike sequence may be projected onto the velocity plane 1905 at each of a plurality of rotation angles at 1920. Thus, for example, at 1925, the velocity space 1915 may be rotated about the spatial and temporal axes. The angle of 45 degrees corresponds to the velocity of the spikes of the bar moving from left to right in FIG. 18. Since the rotation of the velocity space in 1925 corresponds or is tuned to the velocity of the vertical bar moving from left to right, the count of the spikes accumulating in the velocity plane 1915 will peak. Thus the peak indicating these spikes are not only emanating from the same point on the vertical bar but the spikes are all moving at the same speed as indicated by rotation angle of the velocity plane.

By rotating the velocity space such that the object representations line u so as to project on top of each other indicates that the object This relationship enables the ability to form velocity vectors. Thus, be rotating the angle so that the object lines up Moreover, as explained above briefly, conventional analog NM cameras operate on the same principal as the human eye within the fovea centralis, wherein each photoreceptor is associated with and directly connected to each RGC to produce a spike that is specific to that photoreceptor. This one-to-one relationship creates a limitation however, in that analog NM cameras, like the photoreceptors in the fovea centralis of the human eye are unable to differentiate a non-moving object on a non-moving background. In the human eye, this deficiency is remediated or cured by the photoreceptors and RGC relationship present in the area of the eye outside the foveal centralis; as explained above, that area includes photoreceptors that are coupled to and communicating with RGCs in an indirect manner through a plurality of neurons that enable the ability to better differentiate a non-moving or slow moving object from a non-moving or slow moving background.

In the same way, the digital nature of the presently disclosed digital NM vision system synthesizes the relationship between neurons provided between the photoreceptors and the RGCs in the human eye that enable "cross-talk" or communication and consideration of photoreceptor data from nearby, neighboring and/or near photoreceptors prior to that data being used to generate spike data by the RGCs. Thus, the spike data generated by the digital NM vision system of presently disclosed generates different data than that generated by analog NM vision systems in that the digital NM spike data is based on more comprehensive data.

In accordance with at least one disclosed embodiment, the spike data may be augmented or used in combination with image data generated by filtering incoming image data using a color opposite adaptive threshold. In such an implementation, the use of center surround filters (like center-surround receptive fields in the retina of an eye) may be used to generate image data that may, in turn enable the ability to generate zero-crossings that may be used for edge detection. Such capabilities have particular technical utility alone, and when combined with the other functionality described herein because they enable the ability to use the zero-crossing data to identify and utilize root polynomial data so as to attain sub-pixel accuracy.

As a result, in accordance with at least some embodiments, velocity vectors may be computed by rotating and/or skewing the velocity space provided by even a single frame of image data.

In accordance with at least one implementation, the digital NM sensor may be incorporated in a stereo neuromorphic pair of assemblies. Further, in accordance with at least one implementation, the digital NM detector may be incorporated in a compound camera. In such an implementation, the computational element of each imaging sensor may be coupled to other computational elements of other imaging sensors, e.g., adjacent sensors. Such computation elements may be configured to collaborate with other computational elements to provide functionality.

In accordance with at least one implementation, the digital NM detector may be incorporated in an event based camera. In one such implementation, data generated by one or more sensors measuring any type of data including, visual, audio, temperature, force, direction, location, motion, or any associated characteristic related thereto, may trigger operation of one or more NM detectors to generate and/or analyze NM data.

In an implementation that uses rolling and global shutters, additional functionality for the image data detector may be provided by exploiting differences of rolling and global shutters. For example, rolling shutters may provide more motion detail. In accordance with at least one implementation, the digital NM sensor may be implemented in conjunction with sensors that produce data other than video, e.g., LIDAR, RADAR, Time-of-flight, etc.

In accordance with at least one implementation, the digital NM detector may be implemented in a system that utilizes them in parallel with other types of sensors. For example, a digital NM detector may be used to create a composite image based on the aggregate information from various sensors In accordance with at least one implementation, the digital NM detector may be utilized in a dual camera configuration that utilizes a half mirror. Additional utility is provided by such an embodiment in that the dual camera configuration enables powerful combinations and redundancy.

In accordance with at least one embodiment, the hardware and methodologies may be utilized as an effective method for compressing high framerate video, e.g., by analyzing image data to compress the data by capturing differences between a current frame and a one or more previous frames and applying a transformation. For example, as explained above, in accordance with at least one embodiment, the engine and methodologies may compress high frame rate video data by performing feature extraction close to an imaging sensor to generate an encoded version of image data that includes differences and surrounding spatio temporal regions for subsequent image processing.

In accordance with at least one embodiment, human eye NM vision may be simulated using a digital implementation that utilizes communication and consideration of multiple photoreceptor data to generate spike data; as a result, that spike data may be used to compress high frame rate video data by performing feature extraction close to the digital NM imaging sensor to generate an encoded version of image data that includes differences and surrounding spatio-temporal regions for subsequent image processing. Accordingly, the hardware and methodologies may be utilized as an effective method for compressing high framerate video, e.g., by analyzing image data to compress the data by capturing differences between a current frame and a one or more previous frames and applying a transformation.

In accordance with at least some disclosed embodiments, the disclosed embodiments may be used to obtain image data and analyze that image data to improve operation, assistance, control and/or analysis of image data in vehicle driving scenarios, for example, but not limited to those used in driver assist functionality, automated/autonomous driving functionality, and the like.

Indeed, conventional image processing, object detection, classification, and tracking are the most challenging tasks in assisted and autonomous driving especially in bad environments, bad lighting conditions, and low false positive/negative rates. Disclosed embodiments enable an increase in the speed, robustness and effectiveness in image processing by reducing extraneous data previously necessary to perform object detection, classification and tracking. Additional utility is provided as well including image data compression, deep learning capabilities with machine learning.

The large quantity of data not only causes storage challenges but also challenges regarding processor capabilities for analyzing such data in an effective manner. Such a large amount of generated data is not useful for driver assistance or autonomous driving applications if the data cannot be analyzed in a timely manner to provide direction and/or control.

Disclosed embodiments may be implemented in conjunction with components of autonomous driving systems and driver assistance systems included in automotive vehicles. Thus, the utility of the disclosed embodiments within those technical contexts is described in detail. However, the scope of the innovative concepts disclosed herein is not limited to those technical contexts. Therefore, it should be understood that the disclosed embodiments provide utility in all aspects of image processing and control, analysis and diagnostic systems utilizing image processing.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

APPENDIX A

```
retina[rows, cols] ; // contains current state
List of Spikes ; // list of spikes from the last N frames.
processFrame (timestamp, image) {
   // Generate spikes by comparing to each pixel in the
   // input image to the current retina state. If the pixel is above
   // or below the current state within a spike threshold, issue a
   // spike and update the retina to the new pixel value.
   for (row = 0 ; row < rows ; ++row) {
   for (col = 0 ; col < cols ; ++col) {
      p = image[row, col] ;
      r = retina [row, col] ;
      if (p > (r+spike_threshold)) {
         retina[row, col] = p ;
         polarity = 1 ;
         Spikes.add(timestamp, row, col, polarity) ;
      }
      else if (p < (r-spike_threshold)) {
         retina[row, col] = p ;
         polarity = -1 ;
         Spikes.add(timestamp, row, col, polarity) ;
```

APPENDIX A-continued

```
      }
    }
  }
}
// compute the velocity vectors for each spike by searching all
// all horizontal and vertical velocities. Project all unassigned spikes
// to bins subdividing the velocity plane by skewing or rotating space-
// time to the current search velocity.
for (vrow = -vmax ; vrow <= vmax ; vrow += delta_vel) {
for (vcol = -vmax ; vcol <= vmax ; rcol +delta_vel) {
  plane.clear( ) ;
  foreach (spike in Spikes) {
    if (spike.vrow or spike.vcol not assigned) {
      (plane_vel_row, plane_vel_col) =
        rotate_or_skew_time_space(spike.row, spike.col, vrow, vcol) ;
      plane[plane_vel_row, plane_vel_col]++ ;
    }
  }
  // scan the velocity plane for any bin that exceeds a velocity
  // threshold and assign the current search velocity to those spikes.
  for (row = 0 ; row < rows ; ++row) {
  for(col = 0 ; col < cols ; ++col) {
    if (plane[row,vcol] > velocity_threshold) {
      spike[i].vrow = vrow ;
      spike[i].vcol = vcol ;
    }
  }
  }
}
}
}
```

The invention claimed is:

1. A neuromorphic vision system generating and processing image data, the system comprising:
an image sensor comprising a plurality of photoreceptors each generating image data for generation of spike data, wherein spike data indicates whether an intensity value measured by that photoreceptor exceeds a threshold;
means for generating the spike data based on image data generated by the plurality of photoreceptors, the means for generating the spike data comprising a plurality of computational elements corresponding to the plurality of photoreceptors of the image sensor, wherein each of the plurality of computational elements generates spike data for the respective corresponding photoreceptor based on the image data generated by at least two of the plurality of photoreceptors, wherein the at least two of the plurality of photoreceptors includes the respective corresponding photoreceptor and a photoreceptor neighboring the respective corresponding photoreceptor; and
a digital neuromorphic engine coupled to the means for generating spike data and receiving the generated spike data, the digital neuromorphic engine including one or more processors running software configured to generate, based on the spike data, digital neuromorphic output data that includes velocity vector data,
wherein the velocity vector data represents a velocity space, which is a spatial and temporal representation of the image data generated by the plurality of photoreceptors.

2. The neuromorphic vision system of claim 1, wherein the velocity vector data are aggregated and associated with one another to perform velocity segmentation to identify and differentiate objects within the image data based on their relative motion over frames of image data.

3. The neuromorphic vision system of claim 1, wherein the digital neuromorphic vision system compresses high framerate input video data generated by the plurality of photoreceptors by performing feature extraction to generate an encoded version of the image data by capturing differences between a current frame of image data and one or more previous frames of image data and applying a velocity transformation thereon.

4. The neuromorphic vision system of claim 1, wherein the digital neuromorphic vision system is incorporated in a stereo neuromorphic pair.

5. The neuromorphic vision system of claim 1, wherein the digital neuromorphic vision system is incorporated in a compound camera.

6. The neuromorphic vision system of claim 1, further comprising at least one sensor measuring data for a characteristic including audio, temperature, force, direction, location, and motion, wherein operation of the image sensor is controlled based on the measured data.

7. The neuromorphic vision system of claim 1, wherein the plurality of computational elements are implemented in a field-programmable gate array.

8. The neuromorphic vision system of claim 1, wherein the plurality of computational elements are implemented using complementary metal-oxide-semiconductor technology.

9. The neuromorphic vision system of claim 1, wherein the plurality of computational elements cooperate to generate an encoded version of image data that includes only data indicating differences indicative of movement and surrounding spatio-temporal regions for subsequent image processing.

10. A method for generating and processing neuromorphic vision image data, the method comprising:
generating image data using a plurality of photoreceptors, the image data including intensity values measured by the plurality of photoreceptors;
generating spike data using a plurality of computation elements, the spike data indicating whether the measured intensity values exceed a threshold,
wherein generation of the spike data is performed using the plurality of computational elements which correspond to the plurality of photoreceptors, wherein each of the plurality of computational elements generates spike data for the respective corresponding photoreceptor based on the image data generated by at least two of the plurality of photoreceptors,
wherein the at least two of the plurality of photoreceptors includes the respective corresponding photoreceptor and a photoreceptor neighboring the respective corresponding photoreceptor; and
generating digital neuromorphic output data using a digital neuromorphic engine coupled to the plurality of computational elements, wherein the digital neuromorphic output data includes velocity vector data based on the generated spike data,
wherein the velocity vector data represents a velocity space, which is a spatial and temporal representation of the image data generated by the plurality of photoreceptors.

11. The method for generating and processing neuromorphic vision image data of claim 10, further comprising aggregating and associating the velocity vector data with one another to perform velocity segmentation to identify and differentiate objects within the image data based on their relative motion over frames of image data.

12. The method for generating and processing neuromorphic vision image data of claim 10, high framerate input video data generated by the plurality of photoreceptors is compressed by performing feature extraction to generate an encoded version of the image data by capturing differences between a current frame of image data and one or more previous frames of image data and applying a velocity transformation thereon.

13. The method for generating and processing neuromorphic vision image data of claim 10, further comprising measuring data for at least one characteristic using at least one sensor, the at least one characteristic including audio, temperature, force, direction, location, and motion, wherein operation of the plurality of photoreceptors is controlled based on the measured data.

14. The method for generating and processing neuromorphic vision image data of claim 10, wherein the plurality of computational elements are implemented in a field-programmable gate array.

15. The method for generating and processing neuromorphic vision image data of claim 10, wherein the plurality of computational elements are implemented using complementary metal-oxide-semiconductor technology.

16. The method for generating and processing neuromorphic vision image data of claim 10, wherein the plurality of computational elements cooperate to generate an encoded version of image data that includes only data indicating differences indicative of movement and surrounding spatio-temporal regions for subsequent image processing.

17. A non-transitory computer readable medium including software instructions for performing a method for generating and processing neuromorphic vision image data when the software is run on one or more processors, the method comprising:
generating image data using a plurality of photoreceptors, the image data including intensity values measured by the plurality of photoreceptors;
generating spike data using a plurality of computation elements, the spike data indicating whether the measured intensity values exceed a threshold,
wherein generation of the spike data is performed using the plurality of computational elements which correspond to the plurality of photoreceptors, wherein each of the plurality of computational elements generates spike data for the respective corresponding photoreceptor based on the image data generated by at least two of the plurality of photoreceptors,
wherein the at least two of the plurality of photoreceptors includes the respective corresponding photoreceptor and a photoreceptor neighboring the respective corresponding photoreceptor; and
generating digital neuromorphic output data using a digital neuromorphic engine coupled to the plurality of computational elements, wherein the digital neuromorphic output data includes velocity vector data based on the generated spike data,
wherein the velocity vector data represents a velocity space, which is a spatial and temporal representation of the image data generated by the plurality of photoreceptors.

18. The non-transitory computer readable medium including software for performing the method for generating and processing neuromorphic vision image data of claim 17, wherein the method further comprises aggregating and associating the velocity vector data with one another to perform velocity segmentation to identify and differentiate objects within the image data based on their relative motion over frames of image data.

19. The non-transitory computer readable medium including software for performing the method for generating and processing neuromorphic vision image data of claim 17, wherein high framerate input video data generated by the plurality of photoreceptors is compressed by performing feature extraction to generate an encoded version of the image data by capturing differences between a current frame of image data and one or more previous frames of image data and applying a velocity transformation thereon.

20. The non-transitory computer readable medium including software for performing the method for generating and processing neuromorphic vision image data of claim 17, wherein the method further comprises measuring data for at least one characteristic using at least one sensor, the at least one characteristic including audio, temperature, force, direction, location, and motion, wherein operation of the plurality of photoreceptors is controlled based on the measured data.

21. The non-transitory computer readable medium including software for performing the method for generating and processing neuromorphic vision image data of claim 17, wherein the plurality of computational elements are implemented in a field-programmable gate array.

22. The non-transitory computer readable medium including software for performing the method for generating and processing neuromorphic vision image data of claim 17, wherein the plurality of computational elements are implemented using complementary metal-oxide-semiconductor technology.

23. The non-transitory computer readable medium including software for performing the method for generating and processing neuromorphic vision image data of claim 17, wherein the plurality of computational elements cooperate to generate an encoded version of image data that includes only data indicating differences indicative of movement and surrounding spatio-temporal regions for subsequent image processing.

24. A neuromorphic vision system generating and processing image data, the system comprising:
an image sensor comprising a plurality of photoreceptors each generating image data for generation of spike data, wherein spike data indicates whether an intensity value measured by that photoreceptor exceeds a threshold;
at least one integrated circuit and associated software configured to generate the spike data based on image data generated by the plurality of photoreceptors, wherein the at least one integrated circuit and associated software provide a plurality of computational elements corresponding to the plurality of photoreceptors of the image sensor, wherein each of the plurality of computational elements generates spike data for the respective corresponding photoreceptor based on the image data generated by at least two of the plurality of photoreceptors, wherein the at least two of the plurality of photoreceptors includes the respective corresponding photoreceptor and a photoreceptor neighboring the respective corresponding photoreceptor; and
a digital neuromorphic engine coupled to the at least one integrated circuit and associated software configured to generate the spike data and receiving the generated spike data, the digital neuromorphic engine including one or more processors running software configured to generate, based on the spike data, digital neuromorphic output data that includes velocity vector data,
wherein the velocity vector data represents a velocity space, which is a spatial and temporal representation of the image data generated by the plurality of photoreceptors.

25. The neuromorphic vision system of claim 24, wherein the velocity vector data are aggregated and associated with one another to perform velocity segmentation to identify and differentiate objects within the image data based on their relative motion over frames of image data.

26. The neuromorphic vision system of claim 24, wherein the digital neuromorphic vision system compresses high framerate input video data generated by the plurality of photoreceptors by performing feature extraction to generate an encoded version of the image data by capturing differences between a current frame of image data and one or more previous frames of image data and applying a velocity transformation thereon.

27. The neuromorphic vision system of claim 24, wherein the digital neuromorphic vision system is incorporated in a stereo neuromorphic pair.

28. The neuromorphic vision system of claim 24, wherein the digital neuromorphic vision system is incorporated in a compound camera.

29. The neuromorphic vision system of claim 24, further comprising at least one sensor measuring data for a characteristic including audio, temperature, force, direction, location, and motion, wherein operation of the image sensor is controlled based on the measured data.

30. The neuromorphic vision system of claim 24, wherein the at least one integrated circuit includes a field-programmable gate array.

31. The neuromorphic vision system of claim 24, wherein the at least one integrated circuit includes is implemented using complementary metal-oxide-semiconductor technology.

32. The neuromorphic vision system of claim 24, wherein the plurality of computational elements cooperate to generate an encoded version of image data that includes only data indicating differences indicative of movement and surrounding spatio-temporal regions for subsequent image processing.

* * * * *